US010692660B2

(12) United States Patent
Duan et al.

(10) Patent No.: US 10,692,660 B2
(45) Date of Patent: Jun. 23, 2020

(54) THREE-DIMENSIONAL GRAPHENE FRAMEWORK-BASED HIGH-PERFORMANCE SUPERCAPACITORS

(71) Applicant: THE REGENTS OF THE UNIVERSITY OF CALIFORNIA, Oakland, CA (US)

(72) Inventors: Xiangfeng Duan, Los Angeles, CA (US); Yuxi Xu, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 33 days.

(21) Appl. No.: 15/035,108

(22) PCT Filed: Jul. 30, 2014

(86) PCT No.: PCT/US2014/048966
§ 371 (c)(1),
(2) Date: May 6, 2016

(87) PCT Pub. No.: WO2015/069332
PCT Pub. Date: May 14, 2015

(65) Prior Publication Data
US 2016/0284481 A1 Sep. 29, 2016

Related U.S. Application Data
(60) Provisional application No. 61/902,083, filed on Nov. 8, 2013.

(51) Int. Cl.
*H01G 11/36* (2013.01)
*H01G 11/86* (2013.01)
(Continued)

(52) U.S. Cl.
CPC .......... *H01G 11/36* (2013.01); *C01B 32/192* (2017.08); *H01G 11/24* (2013.01); *H01G 11/28* (2013.01);
(Continued)

(58) Field of Classification Search
None
See application file for complete search history.

(56) References Cited

U.S. PATENT DOCUMENTS 9,484,160 B2 * 11/2016 Zhamu .................. H01G 11/68
2009/0028777 A1 * 1/2009 Zhamu .................. B82Y 30/00
423/448
(Continued)

FOREIGN PATENT DOCUMENTS

CN 102898832 A 1/2013
CN 103237755 A 8/2013
(Continued)

OTHER PUBLICATIONS

Chen, W. et al. (2011) "Self-Assembly and Embedding of Nanoparticles by In Situ Reduced Graphene for Preparation of a 3D Graphene/Nanoparticle Aerogel," Adv. Mater. 23:5679-5683.
(Continued)

Primary Examiner — Dion Ferguson
(74) Attorney, Agent, or Firm — Foley & Lardner LLP

(57) ABSTRACT

An electrochemical capacitor includes a pair of electrodes and an electrolyte disposed between the pair of electrodes. At least a first electrode of the pair of electrodes includes a graphene framework film, and the graphene framework film includes interconnected graphene sheets with nanopores formed in the graphene sheets.

30 Claims, 17 Drawing Sheets

(51) Int. Cl.
  *H01G 11/24*    (2013.01)
  *H01G 11/28*    (2013.01)
  *H01G 11/46*    (2013.01)
  *C01B 32/192*   (2017.01)
  *H01G 11/70*    (2013.01)

(52) U.S. Cl.
  CPC ............. *H01G 11/46* (2013.01); *H01G 11/86* (2013.01); *H01G 11/70* (2013.01); *Y02E 60/13* (2013.01); *Y02T 10/7022* (2013.01)

(56) References Cited

U.S. PATENT DOCUMENTS

| | | | | |
|---|---|---|---|---|
| 2010/0291438 | A1* | 11/2010 | Ahn | H01M 4/133 429/212 |
| 2011/0157772 | A1* | 6/2011 | Zhamu | B82Y 30/00 361/502 |
| 2011/0186786 | A1* | 8/2011 | Scheffer | H01B 1/24 252/510 |
| 2012/0026643 | A1 | 2/2012 | Yu et al. | |
| 2012/0034442 | A1 | 2/2012 | Pauzauskie et al. | |
| 2013/0021718 | A1 | 1/2013 | Yager | |
| 2013/0040283 | A1 | 2/2013 | Star et al. | |
| 2013/0156678 | A1 | 6/2013 | Banerjee et al. | |
| 2013/0189580 | A1 | 7/2013 | Dai et al. | |
| 2013/0224603 | A1 | 8/2013 | Chen et al. | |
| 2014/0147648 | A1* | 5/2014 | Zhamu | C30B 5/00 428/220 |
| 2014/0178759 | A1* | 6/2014 | Worsley | H01M 4/131 429/220 |
| 2015/0291431 | A1* | 10/2015 | Tang | B82Y 30/00 361/508 |
| 2017/0316891 | A1* | 11/2017 | Zhamu | H01G 11/86 |

FOREIGN PATENT DOCUMENTS

| | | |
|---|---|---|
| JP | 2006-169058 A | 6/2006 |
| WO | WO-2011/019095 A1 | 2/2011 |
| WO | WO-2011/019431 A1 | 2/2011 |
| WO | WO-2012/057702 A1 | 5/2012 |
| WO | WO-2013/132388 A1 | 9/2013 |

OTHER PUBLICATIONS

Choi et al., "3D Macroporous Graphene Frameworks for Supercapacitors with High Energy and Power Densities," ACS Nano, vol. 6, No. 5, (2012), pp. 4020-4028.

Extended European Search Report and Opinion for European Application No. 14859646.3 dated May 8, 2017, 9 pages.

Jung et al., "Tunable Electrical Conductivity of Individual Graphene Oxide Sheets Reduced at "Low" Temperatures," vol. 8, No. 12, (2008), pp. 4283-4287.

International Search Report and Written Opinion for International Application No. PCT/US2014/048966 dated Nov. 18, 2014, 13 pages.

First Office Action and Search Report for Chinese Patent Application No. 201480072360.0 dated Nov. 10, 2017.

El-Kady, M.F. et al. (2012) "Laser Scribing of High-Performance and Flexible Graphene-Based Electrochemical Capacitors," Science 335(6074):1326-1330.

Liu, C.G. et al. (2010) "Graphene-Based Supercapacitor with an Ultrahigh Energy Density," Nano Lett. 10(12):4863-4868.

LV, W. et al. (2009) "Low-Temperature Exfoliated Graphenes: Vacuum-Promoted Exfoliation and Electrochemical Energy Storage," ACS Nano 3(11):3730-3736.

Miller, J.R. et al. (2010) "Graphene Double-Layer Capacitor with ac Line-Filtering Performance," Science 329(5999):1637-1639.

Stoller, M.D. et al. (2008) "Graphene-Based Ultracapacitors," Nano Lett. 8(10):3498-3502.

Xu, Y. et al. (2013) "Functionalized Graphene Hydrogel-Based High-Performance Supercapacitors," Adv Mater. 25(40):5779-5784.

Xu, Y. et al. (2013) "One-step strategy to graphene/Ni(OH)2 composite hydrogels as advanced three-dimensional supercapacitor electrode materials," Nano Research 6(1):65-76.

Xu, Y. et al. (2014) "Holey graphene frameworks for highly efficient capacitive energy storage," Nature Communications 5:4554.

Yang, X. et al. (2013) "Liquid-mediated dense integration of graphene materials for compact capacitive energy storage," Science 341(6145):534-537.

Zhang, L. et al. (2013) "Porous 3D graphene-based bulk materials with exceptional high surface area and excellent conductivity for supercapacitors," Scientific Reports 3:1408.

Zhu, Y. et al. (2010) "Exfoliation of Graphite Oxide in Propylene Carbonate and Thermal Reduction of the Resulting Graphene Oxide Platelets," ACS Nano 4(2):1227-1233.

Zhu, Y. et al. (2010) "Graphene and Graphene Oxide: Synthesis, Properties, and Applications," Adv Mater. 22:3906-3924.

Zhu, Y. et al. (2011) "Carbon-Based Supercapacitors Produced by Activation of Graphene," Science 332(6037):1537-1541.

\* cited by examiner

Table 1

| Materials | Mass loading/ mg cm$^{-2}$ | Packing density/ g cm$^{-3}$ | Electrolyte (voltage) | $C_{wt}$ / F g$^{-1}$ (current density) | $C_{vol}$ / F cm$^{-3}$ | $E_{wt}$ / Wh kg$^{-1}$ | $E_{vol}$ / Wh L$^{-1}$ | $E_{area}$ / Wh m$^{-2}$ | $E_{v\text{-}stack}$ / Wh L$^{-1}$ | $E_{total}$ / mWh |
|---|---|---|---|---|---|---|---|---|---|---|
| Single-walled CNTs arrays | 5 | 0.5 | Et$_4$NBF$_4$/PC (4.0 V) | 160 (1.0 A/g) | 80 | 94 | 47 | 9.4 | 24.7 | 0.94 |
| Commercial activated carbon | ~5-10 | ~0.5-0.7 | NA (2.5~2.8 V) | 80~120 | 48~84 | 20~30 | 12~21 | 2~6 | 5~7 | NA |
| Carbide derived carbon | 15 | 0.53 | EMIMTFSI (3.0 V) | 160 (0.3 A/g) | 85 | 50 | 26.5 | 15 | NA | 6.0 |
| Chemically reduced graphene | 3.73 | 0.5 | Et$_4$NBF$_4$/AN (2.5 V) | 99 (1.33 A/g) | 49.5 | 21.5 | 10.7 | 1.6 | NA | 0.32 |
| Laser scribed graphene | 0.036 | 0.048 | EMIMBF$_4$ (3.5 V) | 276 (5.0 A/g) | 13.2 | 117.4 | 5.6 | 0.08 | 1.06 | 0.008 |
| Curved graphene | 5 | 0.3 | EMIMBF$_4$ (4.0 V) | 154 (1.0 A/g) | 46.2 | 85.6 | 25.7 | 8.6 | 18.5 | 1.14 |
| Activated graphene | 4 | 0.4 | EMIMBF$_4$ (3.5 V) | 231 (1.0 A/g) | 92 | 98 | 39 | 7.8 | NA | 1.56 |
| a-MEGO | 2.5 | 0.36 | BMIMBF$_4$/AN (3.5 V) | 165 (1.4 A/g) | 59.8 | 70.6 | 25.4 | 3.6 | 17.1 | 0.28 |
| Compressed a-MEGO | 4.3 | 0.75 | BMIMBF$_4$/AN (3.5 V) | 147 (1.2 A/g) | 110 | 63 | 48 | 5.4 | NA | 0.51 |
| asMEGO | 1.3 | 0.59 | EMIMTFSI/AN (3.5 V) | 173 (2.1 A/g) | 102 | 74 | 44 | 1.9 | NA | 0.15 |
| | 10.4 | 0.45 | | 129 (1.1 A/g) | 58 | 55 | 25 | 11 | NA | 0.86 |
| Electrolyte-mediated graphene | 1 | 1.25 | EMIMBF$_4$/AN (3.5 V) | 167 (1.0 A/g) | 209 | 71 | 89 | 1.4 | 17.5 | 0.14 |
| | 10 | 1.25 | | 126 (1.0 A/g) | 158 | 52 | 65 | 10.4 | 46.2 | 1.04 |
| HGF | 1 | 0.71 | EMIMBF$_4$/AN (3.5 V) | 298 (1.0 A/g) | 212 | 127 | 90 | 2.5 | 25.7 | 0.25 |
| | 10 | 0.71 | | 262 (1.0 A/g) | 186 | 112 | 79 | 22.4 | 63.2 | 2.24 |
| | 1 | 0.71 | EMIMBF$_4$ (3.5 V) | 289 (1.0 A/g) | 205 | 123 | 87 | 2.5 | 24.9 | 0.25 |
| | 10 | 0.71 | | 246 (1.0 A/g) | 174 | 105 | 74 | 21 | 59.2 | 2.1 |

Fig. 17

Table 2

| Materials | Current density and/or Scan rate | Electrode system | Specific capacitance (F/g) |
|---|---|---|---|
| FGH | 1-20 A/g | Two | 441-352 |
| Graphene hydrogel | 1-20 A/g | Two | 211-172 |
| N-doped graphene | 1-33 A/g | Two | 282-165 |
| N-doped graphene | 0.2-10 A/g | Three | 326-174 |
| N-doped graphene | 5 mV/s | Two | 302 |
| N and B co-doped graphene | 1-100 mV/s | Three | 239-132 |
| Graphene aerogel | 1-100 mV/s | Three | 226-83 |
| Solvated graphene film | 1-100 A/g | Two | 215-175 |
| Laser scribed graphene | 1-10 A/g | Two | 222-179 |
| Reduced graphene oxide | 1.3-2.7 A/g | Two | 135-128 |
| Reduced graphene oxide | 0.1 A/g | Two | 205 |
| Functionalized graphene | 0.05-10 A/g | Two | 417-298 |
| Functionalized graphene | 0.1-5 A/g | Three | 276-205 |
| Expanded graphene oxide | 0.1 A/g | Two | 264 |

Fig. 28

Table 3

| Materials | Electrode system | Current density and/or Scan rate | Specific capacitance (F/g) | Cycling stability |
|---|---|---|---|---|
| FGH | Two | 1-20 A/g | 441-352 | 2000 (93%) 10000 (86%) |
| Polyaniline/ graphene | Three | 0.5-5.3 A/g | 347-267 | NA |
| Polyaniline/ graphene | Three | 0.5-1 A/g | 260-210 | 1000 (70%) |
| Polyaniline/ graphene | Two | 0.3-6 A/g | 210-174 | 800 (79%) |
| Polyaniline/ graphene | Two | 0.5-2 A/g | 330-228 | 2000 (92%) |
| Polypyrrole/ graphene | Three | 0.5-10 A/g | 285-208 | 800 (92%) |
| $MnO_2$/ graphene | Three | 0.15-1 A/g | 216-110 | 1000 (84%) |
| $MnO_2$/ graphene | Three | 2-500 mV/s | 310-229 | 15000 (95%) |

Fig. 29

Table 4

| Materials | Current density and/or Scan rate | Specific capacitance (F/g) | Cycling stability |
|---|---|---|---|
| FGH | 1-20 A/g | 412-304 | 1000 (97%) 10000 (87%) |
| N and B co-doped graphene | 5-100 mVs | 124-52 | NA |
| Laser scribed graphene | 1-20 A/g | 204-153 | 10000 (97%) |
| Carbon nanotubes | 1-30 A/g | 110-36 | NA |
| Functionalized graphene | 1-30 A/g | 118-106 | 1000 (92%) |
| Polyaniline/ carbon nanotubes | 0.1-4 A/g | 350-310 | 1000 (92%) |
| Polypyrrole | 0.3-5.6 A/g | 235-139 | 10000 (76%) |

THREE-DIMENSIONAL GRAPHENE FRAMEWORK-BASED HIGH-PERFORMANCE SUPERCAPACITORS

CROSS REFERENCE TO RELATED APPLICATION

This application is a National Stag Entry of PCT/US2014/048966, filed Jul. 30, 2014, which claims the benefit of U.S. Provisional Application Ser. No. 61/902,083, filed Nov. 8, 2013, the contents of which are incorporated herein by reference in their entirety.

STATEMENT REGARDING FEDERALLY SPONSORED RESEARCH OR DEVELOPMENT

This invention was made with Government support under 0956171, awarded by the National Science Foundation. The Government has certain rights in the invention.

TECHNICAL FIELD

This disclosure generally relates to electrochemical energy storage and, more particularly, to electrochemical capacitors (ECs) based on graphene electrodes.

BACKGROUND

ECs, also referred as supercapacitors, represent an attractive technology for energy storage and mobile power supply. ECs typically exhibit superior power density and cycle life, but with a relatively poor energy density at least one order of magnitude lower than those of traditional batteries. An electrode material is a central component of an EC, and can largely dictate its ultimate performance. Considerable efforts have been focused on developing electrode materials that can increase the energy density without sacrificing the power density or cycle life. Current ECs are typically constructed using porous activated carbon electrodes, typically with a gravimetric capacitance of about 80-120 F $g^{-1}$ and a stack energy density of about 4-5 Wh $kg^{-1}$, much lower than that of lead acid batteries (about 25-35 Wh $kg^{-1}$).

Graphene has recently been investigated as an EC electrode material because of its high intrinsic electrical conductivity, excellent mechanical flexibility, an exceptionally large theoretical surface area of about 2630 $m^2$ $g^{-1}$, and a theoretical gravimetric capacitance of about 550 F $g^{-1}$. However, because there is a strong $\pi$-$\pi$ interaction between graphene sheets, they tend to re-stack to form graphite-like powders or films, which can severely decrease the surface area and reduce the ion diffusion rate, resulting in unsatisfactory gravimetric capacitances (typically <180 F $g^{-1}$ in organic electrolytes) and relatively low charging/discharging rates.

Another figure-of-merit to evaluate an electrode material for ECs, in addition to gravimetric capacitance, is volumetric capacitance. There is typically a trade-off between gravimetric and volumetric capacitances for most electrode designs. For example, a highly porous electrode can offer a large specific surface area and can favor ion diffusion for high gravimetric capacitance, but may have a lower volumetric capacitance due to its relatively low packing density. On the other hand, a more compact electrode can boost the volumetric capacitance but decrease the ion-accessible surface area and ion diffusion rate, resulting in a lower gravimetric capacitance and poor rate performance. Therefore, there is a formidable challenge to both achieve high gravimetric and volumetric capacitances while retaining excellent rate capability, which is desired for the development of practical ECs with high energy and power densities.

It is against this background that a need arose to develop described herein.

SUMMARY

ECs are desirable for their potential applications in areas such as electric vehicles, mobile electronic devices, and power supplies, among others. However, their widespread use has been constrained by their relatively low energy density. As explained for some embodiments of this disclosure, energy density is greatly improved by using a three-dimensional (3D) graphene framework with a hierarchical porous structure as a high-performance, binder-free, EC electrode. Mechanically compressed graphene frameworks satisfy several criteria of a desirable EC electrode, including high electrical conductivity, high ion transport rate and ion-accessible surface area, and high packing density, resulting in unprecedented gravimetric and volumetric capacitances. In some embodiments, a graphene framework electrode can deliver a gravimetric capacitance of about 298 F $g^{-1}$ (or more) and a volumetric capacitance of about 212 F $cm^{-3}$ (or more) in an organic electrolyte. More generally, the gravimetric capacitance at a current density of about 1 A $g^{-1}$ (or 10 A $g^{-1}$ or another higher or lower current density) is at least about 180 F $g^{-1}$, at least about 200 F $g^{-1}$, at least about 220 F $g^{-1}$, at least about 240 F $g^{-1}$, at least about 250 F $g^{-1}$, at least about 260 F $g^{-1}$, or at least about 280 F $g^{-1}$, and up to about 320 F $g^{-1}$, up to about 360 F $g^{-1}$, up to about 400 F $g^{-1}$, up to about 440 F $g^{-1}$, or more, and the volumetric capacitance at a current density of about 1 A $g^{-1}$ (or 10 A $g^{-1}$ or another higher or lower current density) is at least about 100 F $cm^{-3}$, at least about 120 F $cm^{-3}$, at least about 140 F $cm^{-3}$, at least about 160 F $cm^{-3}$, at least about 180 F $cm^{-3}$, at least about 200 F $cm^{-3}$, or at least about 210 F $cm^{-3}$, and up to about 240 F $cm^{-3}$, up to about 280 F $cm^{-3}$, up to about 320 F $cm^{-3}$, up to about 360 F $cm^{-3}$, or more. In some embodiments, a graphene framework electrode can deliver a gravimetric energy density of at least about 80 Wh $kg^{-1}$, at least about 90 Wh $kg^{-1}$, at least about 100 Wh $kg^{-1}$, at least about 110 Wh $kg^{-1}$, or at least about 120 Wh $kg^{-1}$, and up to about 150 Wh $kg^{-1}$ or more, and a volumetric energy density of at least about 50 Wh $L^{-1}$, at least about 60 Wh $L^{-1}$, at least about 70 Wh $L^{-1}$, at least about 80 Wh $L^{-1}$, or at least about 90 Wh $L^{-1}$, and up to about 120 Wh $L^{-1}$ or more. Furthermore, a fully packaged device stack of some embodiments can deliver gravimetric and volumetric energy densities of about 20 Wh $kg^{-1}$ or more (e.g., about 30 Wh $kg^{-1}$ or more, or about 35 Wh $kg^{-1}$ or more) and about 30 Wh $L^{-1}$ or more (e.g., about 40 Wh $L^{-1}$ or more, or about 49 Wh $L^{-1}$ or more), respectively, approaching those of lead acid batteries. The achievement of such high energy density bridges the gap between ECs and batteries, and can open up opportunities for mobile power supply in diverse applications.

Some aspects of this disclosure are directed to an EC. In some embodiments, the EC includes a pair of electrodes and an electrolyte disposed between the pair of electrodes. At least a first electrode of the pair of electrodes includes a graphene framework film, and the graphene framework film includes interconnected graphene sheets with nanopores formed in the graphene sheets.

Other aspects of this disclosure are directed to an electrode structure. In some embodiments, the electrode structure includes a current collector and a graphene-based gel connected to the current collector. The graphene-based gel includes interconnected graphene sheets, and has a packing density of about 0.1 g cm$^{-3}$ or more.

In other embodiments, the electrode structure includes a current collector and a graphene-based gel connected to the current collector. The graphene-based gel includes interconnected graphene sheets and electrochemically active molecular species adsorbed on the graphene sheets.

Further aspects of this disclosure are directed to a method of forming a graphene framework. In some embodiments, the method is an one-step process of heating a mixture including an etchant and graphene oxide under reducing conditions to yield reduction of graphene oxide to graphene, formation of nanopores in graphene, and self-assembly of graphene into a graphene framework.

In other embodiments, the method is a two-step or multi-step process of initially forming nanopores in graphene oxide sheets, followed by heating a dispersion of the graphene oxide sheets under reducing conditions to yield reduction of the graphene oxide sheets to graphene sheets and self-assembly of the graphene sheets into a graphene framework.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 17: Table 1 showing performance of various carbon based ECs in organic electrolytes. The specific capacitance values of representative porous carbon materials shown in this Table are normalized by the mass of just active electrode materials without considering polymeric or conductive additives. The volumetric stack energy density ($E_{v\text{-stack}}$) shown in this Table does not include the packaging, except for commercial activated carbon.

FIG. 28: Table 2 showing supercapacitive performance of chemically modified graphene.

FIG. 29: Table 3 showing supercapacitive performance of graphene-based pseudo-capacitors. Note: The specific capacitance values reported for other chemically modified graphene and graphene-based pseudo-capacitors shown in Tables 2 and 3 are typically based on the mass of active electrode materials. In contrast to the additive-free FGH electrodes, either, or both, polymer binder (usually polytetrafluoroethylene) and conductive additive (usually carbon black) are used to mix with active materials to make supercapacitor electrodes. These additives account for about 10-20 wt. % of the overall electrode materials, which will further decrease the specific capacitances when normalized to the total mass of electrodes.

FIG. 30: Table 4 showing performance of solid-state supercapacitors based on carbon nanomaterials.

DETAILED DESCRIPTION

To address the challenges of practical ECs, embodiments of this disclosure are directed to 3D graphene frameworks for use as EC electrode materials and the preparation thereof. A graphene framework of some embodiments has a hierarchical porous structure, and can be used in binder-free (or substantially binder-free) and conductive additive-free (or substantially conductive additive-free) EC electrodes with excellent electrical conductivity, high ion transport rate, large ion-accessible surface area, and high packing density, thereby providing ECs with high gravimetric and volumetric capacitances and high energy densities.

As will be understood, graphene is an allotrope of carbon, and its structure is typically one-atom-thick sheets of $sp^2$-bonded carbon atoms that are packed in a honeycomb crystal lattice. In some embodiments, graphene is provided in the form of thin sheets of substantially a monolayer of carbon atoms that can be envisioned as unrolled carbon nanotubes, although a bilayer or other multilayer of graphene is also contemplated.

In some embodiments, graphene sheets in a 3D graphene framework have nanopores that are formed in-plane or in basal planes of the graphene sheets, and the graphene framework can be referred as a holey graphene framework (HGF). In some embodiments, a HGF is formed through etching of nanopores in graphene and self-assembly of graphene into a 3D network structure. In other embodiments, graphene sheets in a 3D graphene framework may be substantially devoid of in-plane nanopores, and the graphene framework can be referred as a non-holey graphene framework (non-holey GF). A structure of a graphene framework, whether holey or non-holey, can be in the form of a gel, and, in some embodiments, the gel can be hydrated to form a hydrogel, or can be solvated with another solvent or other liquid medium. In other embodiments, a liquid medium of a gel can be replaced by air to form an aerogel.

Figure 1:
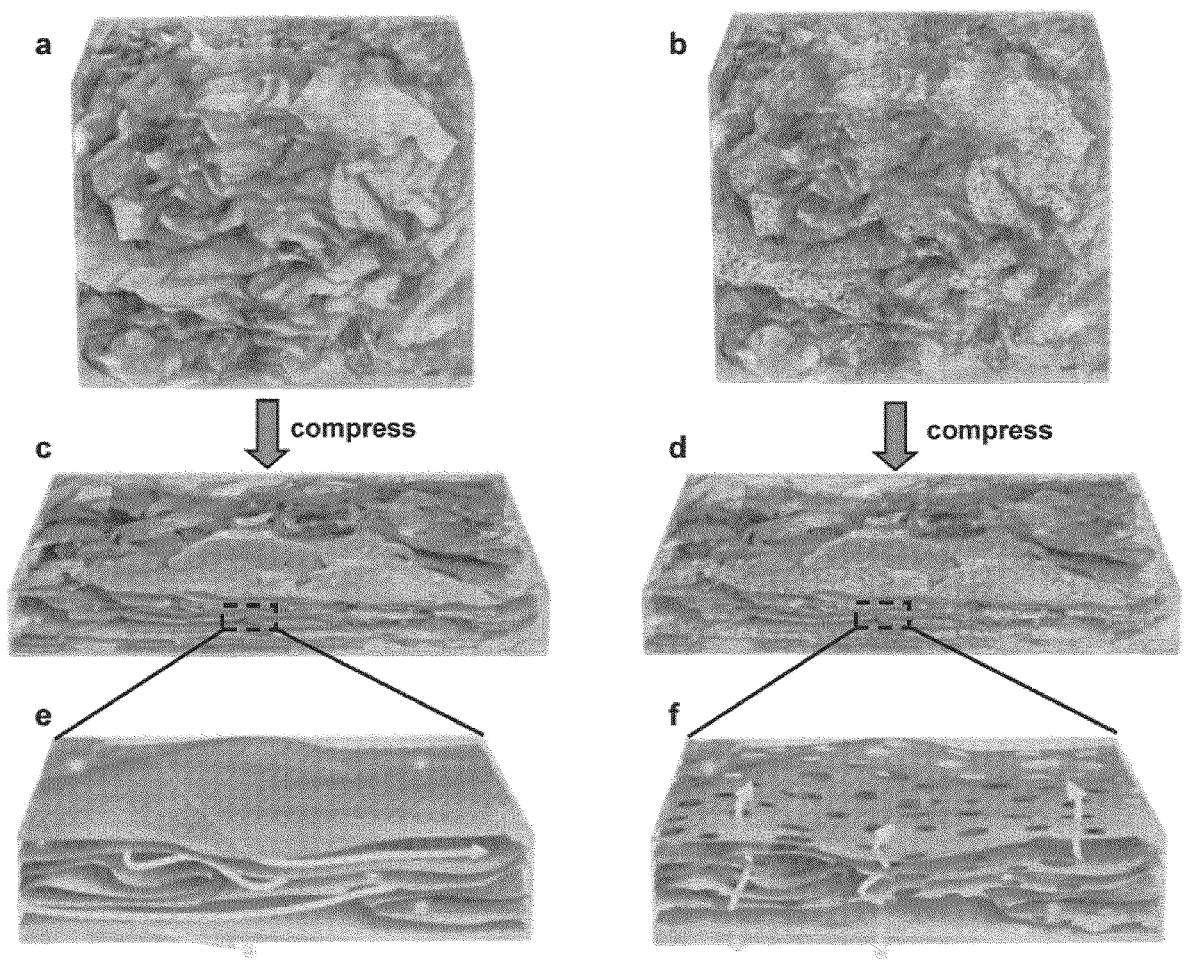
FIG. 1: Schematic illustration of holey graphene frameworks (HGFs) as a material for EC electrodes. (a,b) Initial solvated three-dimensional (3D) macroporous structures of non-holey graphene frameworks (non-holey GFs or GFs as a short-hand) (a) and HGFs (b). (c,d) Compressed films of the solvated non-holey GFs (c) and HGFs (d). (e,f) A closed-up view of non-holey GF (e) and HGF (f) films, with the arrows highlighting the ion transport pathway. The ions in non-holey GF film travel a longer distance to find the broken edge of graphene sheet to cross each layer of graphene sheet in the non-holey GF film, while nanopores in holey graphene sheet of HGF can function as the ion transport shortcuts between neighboring layers of graphene to greatly speed up the ion transport across the entire HGF film.

Attention first turns to FIG. 1, which illustrates a non-holey GF and a HGF, according to an embodiment of this disclosure. The graphene frameworks are formed by conjugating graphene sheets (holey or non-holey) into free-standing, 3D networks. The structure of the graphene frameworks satisfies several criteria for a desirable EC electrode (FIG. 1).

For example, the graphene sheets in the 3D network are highly interconnected and interlocked together to mitigate against their restacking and to maintain a highly porous monolithic structure (FIG. 1a) with a large specific surface area, such as up to about 1030 $m^2 g^{-1}$ or more based on methylene blue adsorption, or, more generally, at least about 500 $m^2 g^{-1}$, at least about 600 $m^2 g^{-1}$, at least about 700 $m^2 g^{-1}$, at least about 800 $m^2 g^{-1}$, at least about 900 $m^2 g^{-1}$, or at least about 1000 $m^2 g^{-1}$, and up to about 1300 $m^2 g^{-1}$, up to about 1500 $m^2 g^{-1}$, up to about 1700 $m^2 g^{-1}$, or up to about 2000 $m^2 g^{-1}$, or more. The formation of in-plane nanopores in holey graphene sheets (FIG. 1b) can further boost the specific surface area, such as up to about 1560 $m^2 g^{-1}$ or more based on methylene blue adsorption, or, more generally, at least about 1000 $m^2 g^{-1}$, at least about 1100 $m^2 g^{-1}$, at least about 1200 $m^2 g^{-1}$, at least about 1300 $m^2 g^{-1}$, at least about 1400 $m^2 g^{-1}$, or at least about 1500 $m^2 g^{-1}$, and up to about 1700 $m^2 g^{-1}$, up to about 2000 $m^2 g^{-1}$, up to about 2300 $m^2 g^{-1}$, or up to about 2500 $m^2 g^{-1}$, or more.

As another example, the graphene frameworks are initially at least partially or substantially fully hydrated (or otherwise solvated), and can allow direct exchange of an electrolyte to ensure a large fraction or substantially the entire surface area is wetted by the electrolyte and accessible by electrolyte ions and thus electrochemically active. This extent of hydration is difficult to achieve in other electrode materials, such as other porous carbon materials.

As another example, the hydrated (or otherwise solvated) graphene frameworks with interlocked graphene sheets can be mechanically compressed to form free-standing, compact graphene framework films (FIG. 1c,d), with little or no restacking to achieve a high packing density, while maintaining the initial hydrated (or otherwise solvated) condition. With mechanical compression, the packing density can be about 0.71 g $cm^{-3}$ or more, or, more generally, at least about 0.1 g $cm^{-3}$, at least about 0.2 g $cm^{-3}$, at least about 0.3 g $cm^{-3}$, at least about 0.4 g $cm^{-3}$, at least about 0.5 g $cm^{-3}$, at least about 0.6 g cm$^{-3}$, or at least about 0.7 g cm$^{-3}$, and up to about 0.8 g cm$^3$, up to about 0.9 g cm$^{-3}$, or up to about 1 g cm$^{-3}$, or more.

As another example, the graphene framework films exhibit excellent electrical conductivity, such as up to about 1000 S m$^{-1}$ or more, which is about one to two orders of magnitude higher than that of activated carbon (about 10-100 S m$^{-1}$) and also two times better than that of activated graphene (500 S m$^{-1}$). More generally, the electrical conductivity of the graphene framework films can be at least about 500 S m$^{-1}$, at least about 600 S m$^{-1}$, at least about 700 S m$^{-1}$, at least about 800 S m$^{-1}$, at least about 900 S m$^{-1}$, or at least about 1000 S m$^{-1}$, and up to about 1300 S m$^{-1}$, up to about 1500 S m$^{-1}$, or up to about 2000 S m$^{-1}$, or more. The high electrical conductivity allows the graphene framework films to be used as EC electrodes directly, with the omission of a polymer binder and conductive additives (or their inclusion at reduced levels). The inclusion of a polymer binder and conductive additives can increase the complexity of electrode preparation, and also can impose an adverse impact on specific capacitance performance.

Figure 10:
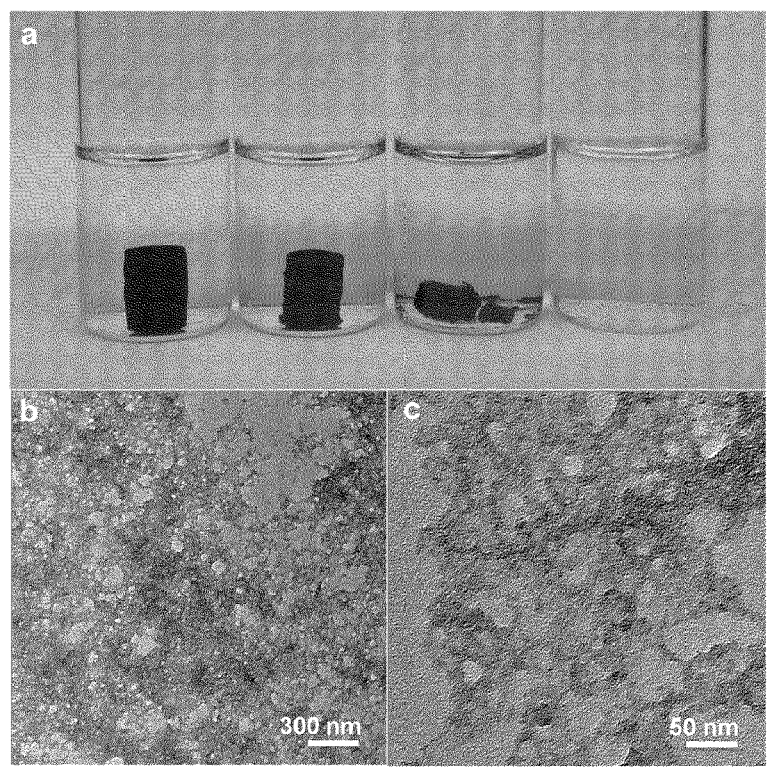
FIG. 10: Control experiments with different concentration of $H_2O_2$. (a) Photographs showing the products obtained with about 0, about 0.3%, about 3% and about 30% $H_2O_2$ (by weight). With about 30% $H_2O_2$, the GO sheets in aqueous dispersion were completely etched during the hydrothermal reaction, resulting in a colorless clear solution. (b,c) Low- (b) and High- (c) magnification TEM images of holey graphene sheets in HGFs obtained with about 3% $H_2O_2$.

As a further example, pores in the graphene frameworks are sufficiently large and well integrated into a hierarchical porous structure to form a highly continuous network of open channels for efficient ion transport substantially throughout the entire network even under a highly compressed form. In particular, the graphene sheets are assembled to form an interconnected 3D macroporous network, with pores between the graphene sheets with sizes ranging from sub-micrometers to several micrometers, such as from about 5 nm, from about 10 nm, from about 100 nm, or from about 500 nm, and up to about 1 μm, up to about 5 μm, up to about 10 μm, or more, and pore walls composed of single- or few-layer graphene sheets. In conjunction, the in-plane nanopores in holey graphene sheets are large enough to function as ion diffusion shortcuts between different layers of graphene to greatly accelerate ion transport across substantially the entire film and facilitate ion access to substantially the entire surface area (FIG. 10, compared with the non-holey GF (FIG. 1e). The in-plane nanopores can have sizes from about 1 nm, from about 2 nm, from about 3 nm, from about 4 nm, or from about 5 nm, and up to about 10 nm, up to about 20 nm, up to about 50 nm, up to about 100 nm, or more. For example, the in-plane nanopores can have sizes from about 1 nm to about 100 nm or from about 1 nm to about 10 nm. A combination or a sub-combination of these features allows the graphene frameworks to achieve high volumetric capacitance while retaining high gravimetric capacitance and excellent rate capability.

In some embodiments, graphene frameworks are formed through self-assembly of graphene into 3D network structures. In the case of HGFs of some embodiments, an one-step process can be used, with a combination of reduction of graphene oxide (GO) to form graphene and formation of nanopores in graphene. Specifically, a controlled amount of H$_2$O$_2$ (or another suitable etchant) can be combined with, or introduced into, a graphene oxide (GO) dispersion. The mixture can be subjected to the hydrothermal process, such as by sealing in an autoclave and heating at a temperature from about 100° C. to about 250° C. (or from about 130° C. to about 250° C.) for about 2 hours to about 10 hours to yield mechanically strong monolithic HGFs. During the hydrothermal process, GO sheets can be reduced and self-assembled into hydrogels with an interconnected 3D macroporous network. In conjunction, H$_2$O$_2$ can partially oxidize and etch carbon atoms around defective sites of GO, leaving behind carbon vacancies which gradually extend into nanopores. It is also contemplated that the formation of nanopores can be carried out sequentially with respect to reduction of GO sheets and self-assembly into a gel according to a two-step process.

Other embodiments of forming graphene frameworks include: (1) hydrogel-based reduced GO by one or more of hydrothermal, chemical, and electrochemical reduction; (2) gelation of GO assisted by a polymer as a cross-linker, such as polyvinyl alcohol, polyethylenimine, DNA, protein, and so forth; (3) gelation of GO promoted by small molecules such as cetyl trimethylammonium bromide (or CTAB), amino acids, nucleosides, multivalent cations, and so forth; (4) gelation of GO promoted by nanomaterials such as carbon nanotubes; (5) hydrogel-based reduced GO by vacuum filtration; (6) ice template by freeze drying; (7) vacuum centrifugal evaporation; (8) template-guided approaches such as chemical vapor deposition, polystyrene colloid template, and liquid drop template; and (9) nanoparticles as spacers between graphene sheets to adjust or control porosity.

Additional embodiments of graphene frameworks are encompassed by this disclosure. For example, a graphene framework of some embodiments can incorporate one or more pseudocapacitive materials to improve a specific capacitance, and to provide a corresponding asymmetric supercapacitor with a high energy density. A mass loading of a pseudocapacitive material in a graphene framework can be at least about 1 wt. %, at least about 5 wt. %, at least about 10 wt. %, at least about 15 wt. %, or at least about 20 wt. %, and up to about 30 wt. %, up to about 50 wt. %, up to about 70 wt. %, or up to about 90 wt. %, or more. Examples of pseudocapacitive materials include electrochemically active molecular species (e.g., having a molecular weight up to about 1000 g mol$^{-1}$ or up to about 500 g mol$^{-1}$), such as hydroquinone and other electrochemically active, aromatic or non-aromatic, saturated or unsaturated, molecular species including hydroxyl groups or other functionalizing moieties to allow adsorption on, or linkage to, surfaces of graphene sheets. Additional examples of pseudocapacitive materials include conducting polymers, such as nitrogen-containing aromatic polymers (e.g., polypyrroles, polycarbazoles, polyindoles, polyanilines, and polyazepines), sulfur-containing aromatic polymers (e.g., poly(3,4-ethylenedioxythiophene)), polythiophenes, polyfluorenes, polyphenylenes, polypyrenes, polyazulenes, polynapthalenes, polyacetylenes, and poly(p-phenylene vinylene). Further examples of pseudocapacitive materials include electrochemically active metal oxides and hydroxides, such as in the form of redox active nanoparticles formed of materials such as ruthenium oxide (e.g., RuO$_2$), manganese oxide (e.g., MnO$_2$), nickel oxide (e.g., NiO), cobalt oxide (e.g., Co$_2$O$_3$ or Co$_3$O$_4$), nickel hydroxide (e.g., Ni(OH)$_2$), and mixed metal oxides and hydroxides. The incorporation of a pseudocapacitive material in a graphene framework can occur via adsorption of the pseudocapacitive material on graphene sheets, growth of the pseudocapacitive material on graphene sheets, or mixing or dispersion of the pseudocapacitive material with, or among, graphene sheets. It is contemplated that the incorporation of a pseudocapacitive material can be carried out in combination, or sequentially, with respect to reduction of GO sheets and self-assembly into a gel.

The graphene framework electrode materials described herein can be used for a variety of ECs and other electrochemical energy storage devices. For example, the graphene framework electrode materials can be used for symmetric ECs, such as double-layer capacitors and pseudocapacitors, and asymmetric ECs, such as hybrid capacitors.

Figure 2:
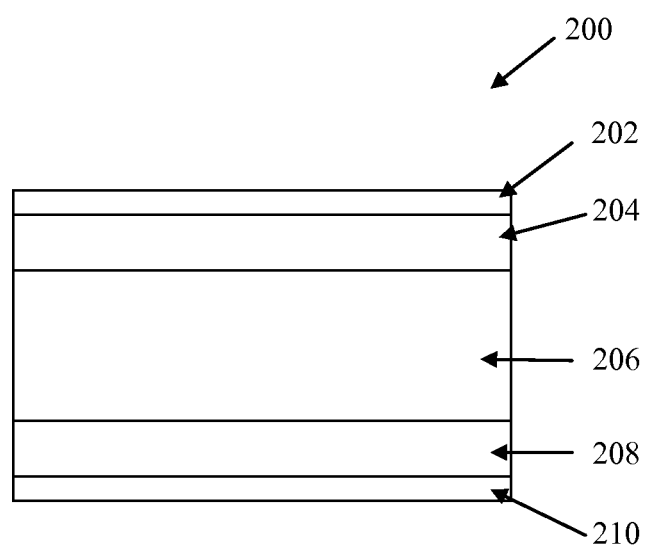
FIG. 2: Schematic of an EC according to an embodiment of this disclosure.

FIG. 2 shows a schematic of an EC 200 that includes a pair of electrodes 204 and 208 and an electrolyte 206 that is disposed between the electrodes 204 and 208. Either one, or both, of the electrodes 204 and 208 can include, or can be formed of, a graphene framework film as described herein. Also, either one, or both, of the electrodes 204 and 208 can incorporate a pseudocapacitive material in the graphene framework film. The electrolyte 206 can be an aqueous electrolyte, an organic electrolyte, or a gel electrolyte. As shown in FIG. 2, the EC 200 also includes a pair of current collectors 202 and 210, and the electrodes 204 and 208 are connected to the current collectors 202 and 210, respectively. Together, the electrode 204 and the current collector 202 (or the electrode 208 and the current collector 210) can correspond to an electrode structure for the EC 200. It is also contemplated that either, or both, of the current collectors 202 and 210 can be omitted in some embodiments.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Holey Graphene Frameworks (HGFs) for Highly Efficient Capacitive Energy Storage

Preparation and Characterization of HGFs.

Figure 3:
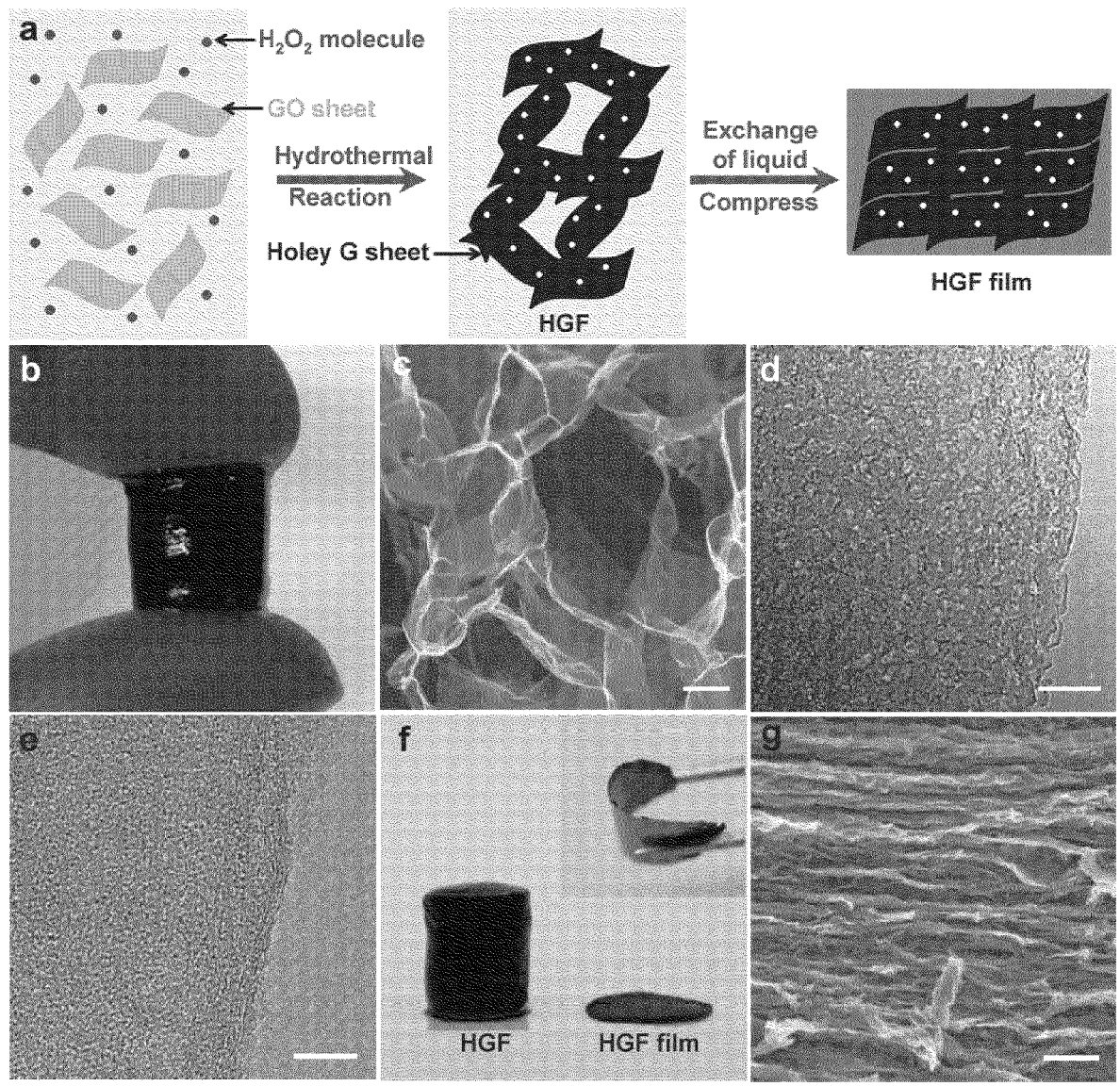
FIG. 3: Preparation and structural characterization of HGFs. (a) Schematic illustration of the preparation process of HGFs and HGF films. (b) A photograph showing a free-standing HGF. (c) Scanning Electron Microscopy (SEM) image of interior microstructures of HGFs. Scale bar, 1 µm. (d) Transmission Electron Microscopy (TEM) image of holey graphene sheets in HGFs. Scale bar, 10 nm. (e) TEM image of non-holey graphene sheets in GFs for comparison. Scale bar, 10 nm. (f) A photograph showing HGFs before and after mechanical compression with the flexibility of the compressed HGF film shown in the inset. (g) Cross-sectional SEM image of the compressed HGF film. Scale bar, 1 µm.
Figure 7:
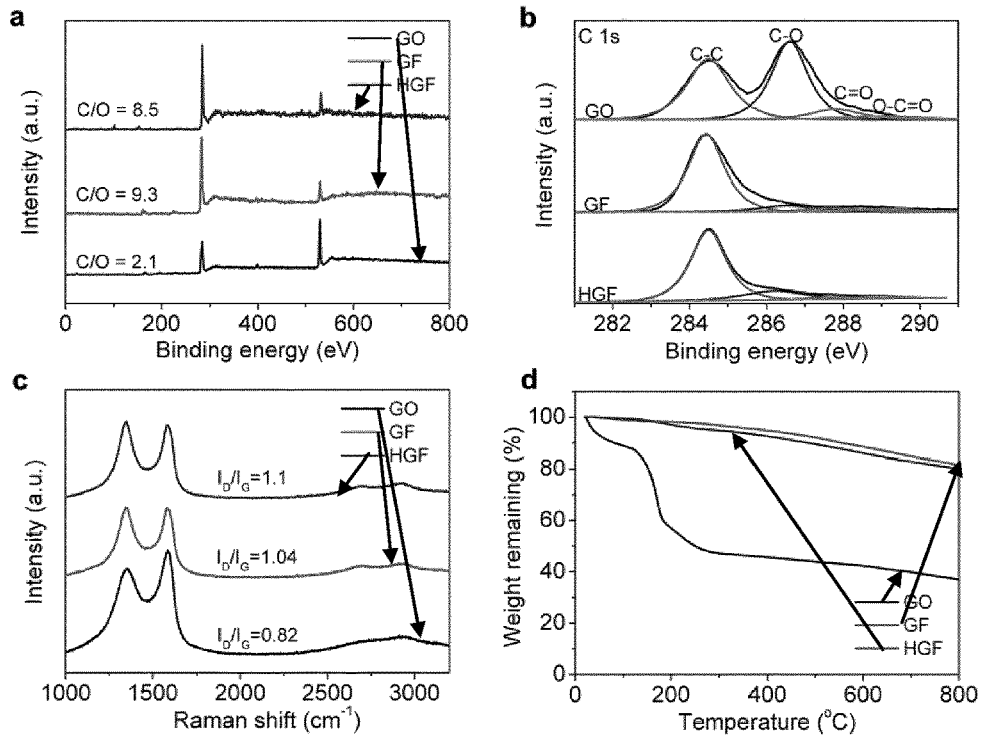
FIG. 7: X-ray Photoelectron Spectroscopy (XPS), Raman and Thermogravimetric Analysis (TGA) characterizations on graphene oxide (GO) and freeze-dried HGF and GF. (a) XPS survey spectra and (b) C1s spectra. (c) Raman spectra. (d) TGA curves. All results confirm efficient de-oxygenation of GO in the as-prepared GF and HGF. XPS studies show that the C/O atomic ratio is about 2.1 for GO to about 9.3 and about 8.5 for GF and HGF, in agreement with those determined from combustion elemental analysis performed using CE 440 Elemental Analyzer (C/O ratio is about 1.8, about 9.1 and about 8.2 for GO, GF and HGF, respectively). The slightly higher D/G ratio in Raman spectra and slightly more weight loss observed in HGF than GF may be attributed to additional defects and oxygen functional groups around the nanopores in HGFs.
Figure 8:
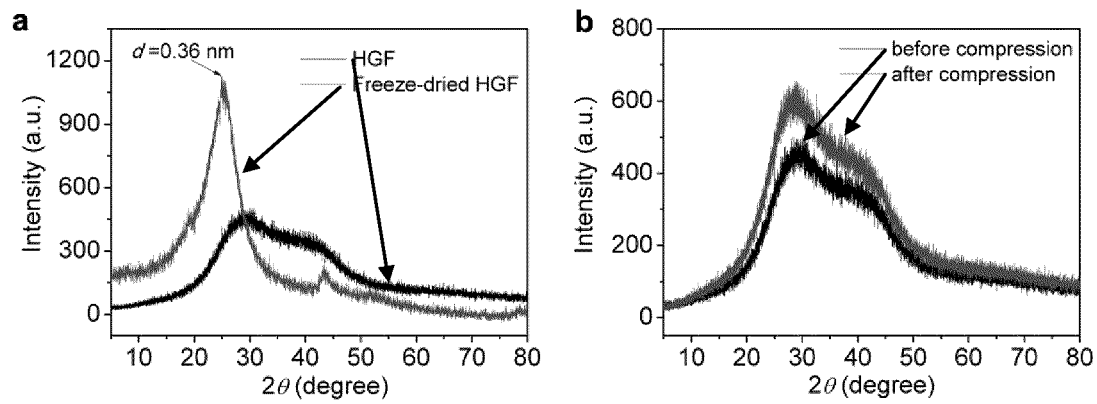
FIG. 8: X-ray Diffraction (XRD) characterization of HGFs. (a) XRD patterns of HGFs before and after freeze-drying. The freeze-dried HGF showed a diffraction peak at about 25° corresponding to the d-spacing of about 0.36 nm, which is close to that of graphite (about 0.33 nm). The Scherrer's equation can be used to derive the thickness of the stacked graphene sheets to be about 1 nm, corresponding to an average layer number of graphene sheets be about 2.8 for the pore walls of freeze-dried HGFs. In contrast, the as-prepared wet HGF showed much broader diffraction peak ranging from about 20° to about 50°, which is likely due to the water confined within the HGF network, and also indicates the poor ordering of graphene sheets along their stacking direction (along C-axis). (b) XRD patterns of HGFs before and after mechanical compression. The diffraction peaks show similar peak width and intensity, suggesting the initial arrangement among graphene sheets in HGFs was not significantly modified (e.g., without noticeable restacking) by mechanical compression, and the large accessible surface area of HGFs could be well maintained.
Figure 9:
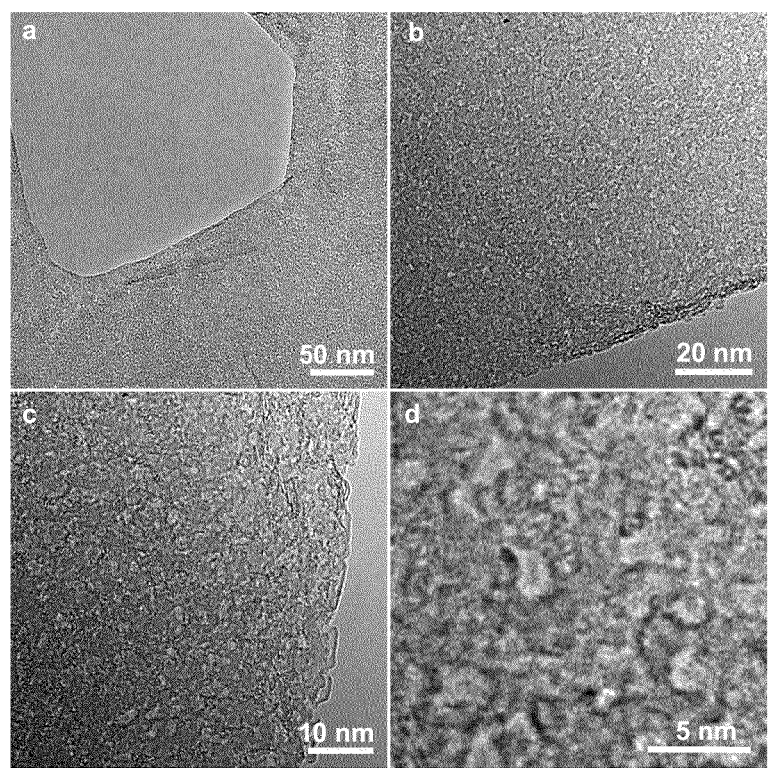
FIG. 9: High-Resolution TEM (HRTEM) images of holey graphene sheets at different magnifications.
Figure 11:
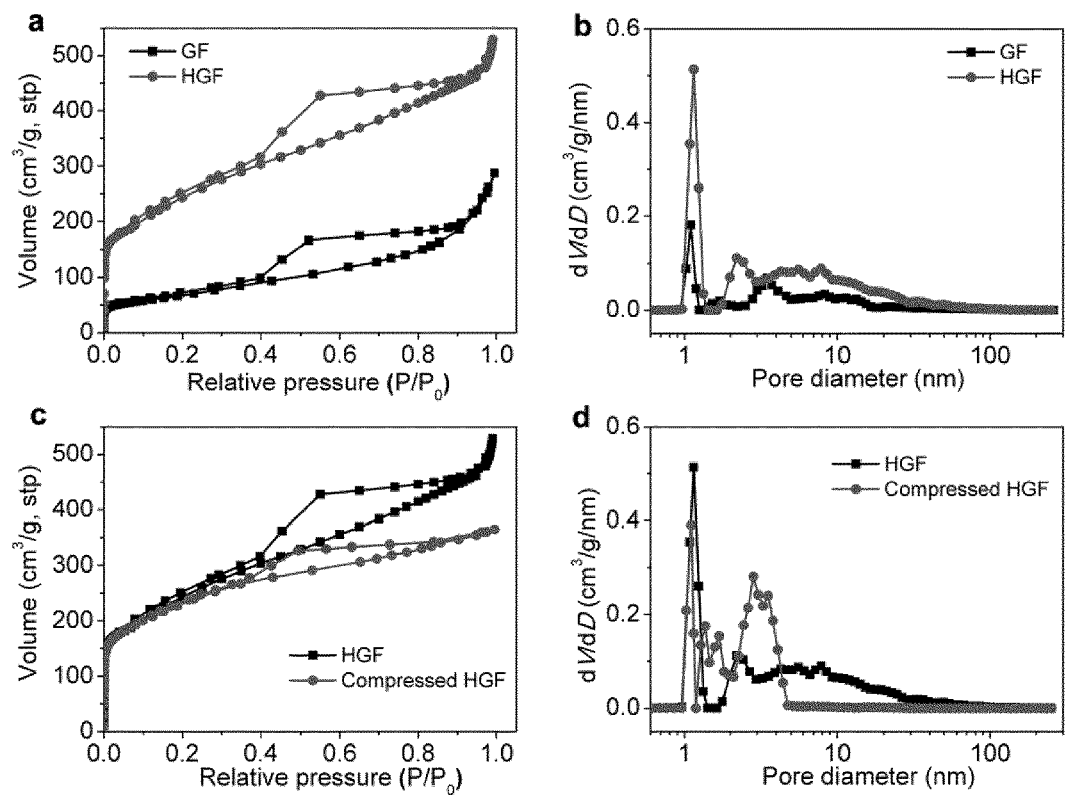
FIG. 11: $N_2$ (77 K) adsorption-desorption tests. (a) $N_2$ isotherms and (b) Density Functional Theory (DFT) pore-size distribution of freeze-dried HGFs and GFs. (c) $N_2$ isotherms and (d) DFT pore-size distribution of freeze-dried uncompressed and compressed HGFs.

The HGFs were prepared through an one-step process with substantially simultaneous low-temperature etching of nanopores in graphene and self-assembly of graphene into three-dimensional (3D) network structures (FIG. 3a). A controlled amount of $H_2O_2$ aqueous solution was added into a well-dispersed graphene oxide (GO) aqueous dispersion. The mixture was sealed in a Teflon-lined autoclave and heated at about 180° C. for about 6 hours to yield mechanically strong monolithic HGFs (FIG. 3b). During the hydrothermal process, GO sheets were reduced (FIG. 7) and self-assembled into hydrogels with interconnected 3D macroporous network (FIG. 3c) with pore sizes ranging from sub-micrometers to several micrometers and pore walls composed of single- or few-layer graphene sheets (FIG. 8). At the same time, $H_2O_2$ molecules can partially oxidize and etch the carbon atoms around the more active defective site of GO, leaving behind carbon vacancies which gradually extend into nanopores. Since the defective carbon sites are generally distributed throughout the basal plane of GO, the etching process can occur across substantially the entire graphene sheets to result in abundant in-plane pores of a few nanometers (FIG. 3d and FIG. 9). In control experiments without adding $H_2O_2$, GFs composed of non-holey graphene sheets (FIG. 3e) are obtained. Furthermore, excessive $H_2O_2$ would lead to a more aggressive etching, enlarging the pore size of holey graphene and breaking them into small pieces (FIG. 10). As a result, the HGFs become fragile and unsuitable for binder-free EC electrodes. Nitrogen adsorption-desorption tests showed the freeze-dried HGF had a Brunauer-Emmett-Teller (BET) specific surface area of about 830 $m^2\ g^{-1}$, which is significantly larger than that of non-holey GF (about 260 $m^2\ g^{-1}$) (FIG. 11a,b). Because the freeze-drying used to prepare a BET sample can induce partial restacking of some graphene layers and reduce the apparent specific surface area, methylene blue adsorption method also is used to more accurately determine the solvated surface area of the HGF to be about 1560 $m^2\ g^{-1}$, and that of non-holey GF to be about 1030 $m^2\ g^{-1}$.

With the highly porous structure and excellent mechanical stability, the as-prepared HGF can be greatly compressed using a hydraulic press to form a free-standing compact HGF film with nearly 60 fold increase in packing density. For example, a piece of about 1-cm thick HGF with a packing density of about 12 mg $cm^{-3}$ can be compressed to an about 140 µm thick flexible film with a packing density of about 0.71 g $cm^{-3}$ (FIG. 3f,g). X-ray diffraction (XRD) studies of HGFs before and after compression showed similar diffraction peak width and intensity, indicating the initial arrangement between graphene sheets in HGFs was not noticeably altered by compression (FIG. 8). Meanwhile, the compressed HGF films exhibited a BET specific surface area of about 810 $m^2\ g^{-1}$, close to that of uncompressed HGFs (about 830 $m^2\ g^{-1}$) (FIG. 11c,d), further indicating that little restacking is occurring in the compressed HGF films. This can be attributed to the robust interlock of graphene sheets that allows mechanical compression to reduce the pore size without significantly modifying the stacking characteristics of graphene and its 3D interconnected porous structure. Importantly, these compressed HGF films can exhibit excellent electrical conductivity of about 1000 S $m^{-1}$, and are mechanically strong enough to be used as EC electrodes directly. To explore the potential of HGFs for capacitive energy storage, fabrication was undertaken of a series of symmetric HGF-based ECs (HGF-ECs) using the compressed HGF films as both electrodes, and their electrochemical characteristics were investigated in aqueous and organic electrolytes. The areal mass loading of HGF in one electrode is about 1 mg $cm^2$ of graphene. As a control experiment, compressed non-holey GF films were also used to create GF-ECs. All electrochemical results below are based on compressed HGF and GF films unless otherwise specified.

Electrochemical Performance of HGFs in Aqueous Electrolyte.

Figure 4:
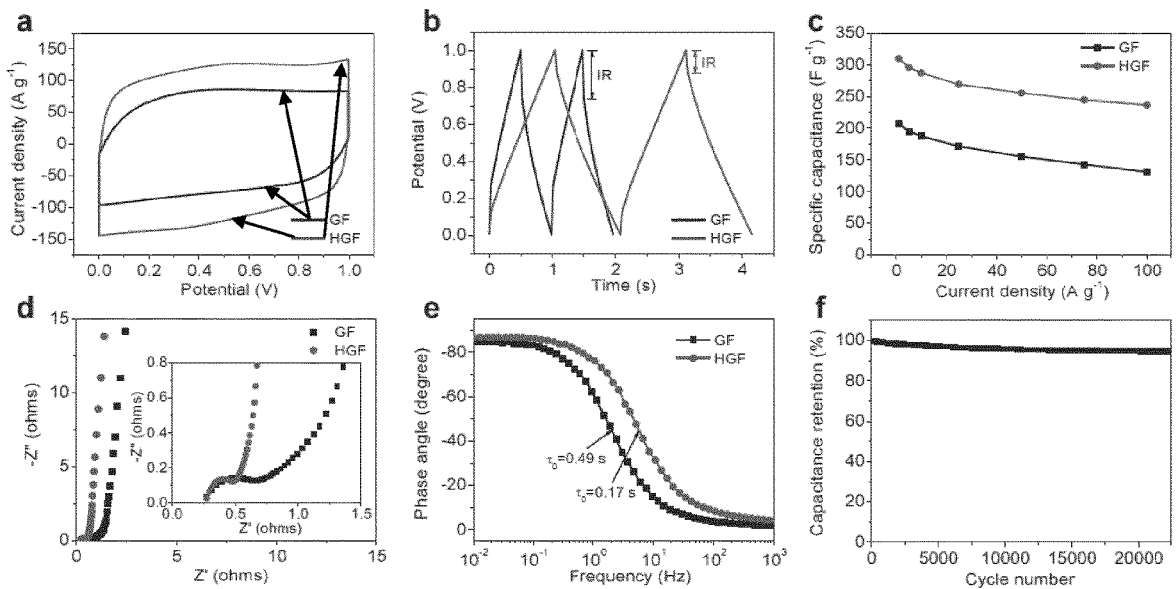
FIG. 4: Electrochemical characterization of HGF-EC and GF-EC in about 6 M KOH. (a) CV curves of HGF-EC and GF-EC at a high scan rate of about 1000 mV s$^{-1}$. (b) Galvanostatic charge/discharge curves of HGF-EC and GF-EC at a high current density of about 100 A g$^{-1}$. (c) Comparison of specific capacitances versus different current densities for HGF-EC and GF-EC. (d) Nyquist plots of HGF-EC and GF-EC. The inset shows the close-up view of the high-frequency regime. (e) Bode plots of phase angle versus frequency. (f) Cycling stability of HGF-EC at a current density of about 25 A g$^{-1}$.

The cyclic voltammetry (CV) (FIG. 4a) and galvanostatic charge/discharge studies (FIG. 4b) showed a greatly enhanced electrochemical performance for HGF-ECs in comparison with GF-ECs. The nearly rectangular CV curves at a high scan rate of about 1000 mV $s^{-1}$ and the nearly triangular charge/discharge curves at a high current density of about 100 A $g^{-1}$ indicate a nearly ideal electrical-double-layer (EDL) capacitive behavior and efficient electrolyte ion transport throughout the HGF electrodes. A weak pair of broad peaks seen in the CV curve is probably due to a minor contribution from the redox reaction of residual oxygen-containing groups on the graphene sheets of HGF. Additionally, it is evident that HGF-EC exhibited a smaller voltage drop (IR drop) of about 0.12 V than GF-EC (about 0.26 V) at the start of the discharge curves (FIG. 4b), from which one can derive the equivalent series resistance (ESR) of about 0.6 and about 1.3Ω for the HGF-EC and GF-EC, respectively. The specific capacitance values can be derived from charge/discharge curves (FIG. 4c). The HGF electrodes exhibited an ultrahigh gravimetric capacitance of about 310 F $g^{-1}$ at a current density of about 1 A $g^{-1}$. In contrast, the gravimetric capacitance of non-holey GF electrodes is about 208 F $g^{-1}$ at about 1 A $g^{-1}$. Upon increasing the current density up to about 100 A/g, the HGF electrodes retained about 76% of its initial capacitance (about 237 F g$^{-1}$), while the non-holey GF only showed about 63% capacitance retention (about 131 F g$^{-1}$).

Ion transport properties are probed within the HGFs using electrochemical impedance spectroscopy (EIS). A frequency response analysis over the frequency range from about 100 kHz and about 10 mHz yields the Nyquist plots (FIG. 4d). The plot features a vertical curve in low frequency regime, indicating a nearly ideal capacitive behavior. A close-up observation of the high-frequency regime reveals a transition from a vertical curve to a 45° Warburg region followed by a semicircle (FIG. 3d, inset). The HGF-EC exhibits a shorter 45° region and smaller diameter semicircle, indicating a lower charge transfer resistance and more efficient electrolyte diffusion within the HGF electrodes. By extrapolating the vertical portion of the plot to the real axis, an ESR of about 0.65 and about 1.25Ω was obtained for HGF-EC and GF-EC, respectively, consistent with the galvanostatic charge/discharge studies (FIG. 4b). It should be noted that the ESR of an EC is related to both electrical resistance of the electrodes and ion diffusion resistance in the electrodes. Although the GF film has a better conductivity than HGF film (about 1400 S/m vs. about 1000 S/m), the HGF film has a much better ion diffusion property (FIG. 4d), leading to a lower ESR and a smaller IR drop in the charge/discharge curves of HGF-EC.

The dependence of phase angle on the frequency for the HGF-EC and GF-EC shows that the phase angles of both devices are close to −90° at low frequencies, confirming an ideal capacitive behavior (FIG. 4e). The characteristic frequency $f_0$ at a phase angle of −45° marks the point where the resistive and capacitive impedances are equal. The HGF-EC and GF-EC exhibit an $f_0$ of about 5.88 Hz and about 2.04 Hz, respectively, which corresponds to a time constant $\tau_0$ ($=1/f_0$) of about 0.17 s for HGF-EC, about one third of that of GF-EC (about 0.49 s) and greatly lower than those of conventional activated carbon-based ECs (about 10 s). This rapid frequency response of HGF-EC further indicates the significantly enhanced ion transport rate within the HGF electrodes. The cycling test of HGF-EC showed about 95% capacitance retention over 20000 cycles at a high current density of about 25 A g$^{-1}$ (FIG. 4f), demonstrating excellent electrochemical stability of the device. These studies demonstrate that the HGF electrodes not only exhibit much higher specific capacitances than GF electrodes, but also show greatly improved rate capability and capacitance retention at high charging/discharging rate, which can be attributed to higher ion-accessible surface area and more rapid ion transport in the hierarchical porous network of HGFs (see FIG. 1e,f).

Electrochemical Performance of HGFs in Organic Electrolyte.

Figure 5:
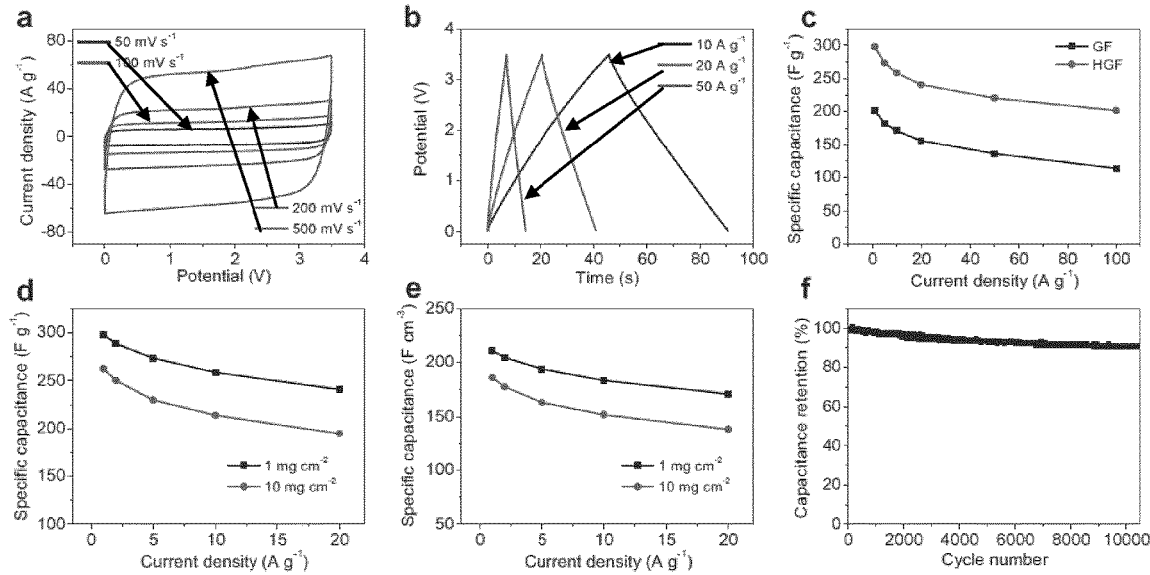
FIG. 5: Electrochemical characterization of HGF-EC in EMIMBF4/AN. (a,b) CV curves (a) and galvanostatic charge/discharge curves (b) of HGF-EC. (c) Comparison of specific capacitances of HGF and GF electrodes versus different current densities. (d,e) Gravimetric (d) and volumetric (e) capacitances of HGF electrodes versus different current densities (with graphene areal mass loading of about 1 and about 10 mg cm$^{-2}$, respectively). (f) Cycling stability of HGF-EC at a current density of about 20 A g$^{-1}$.
Figure 12:
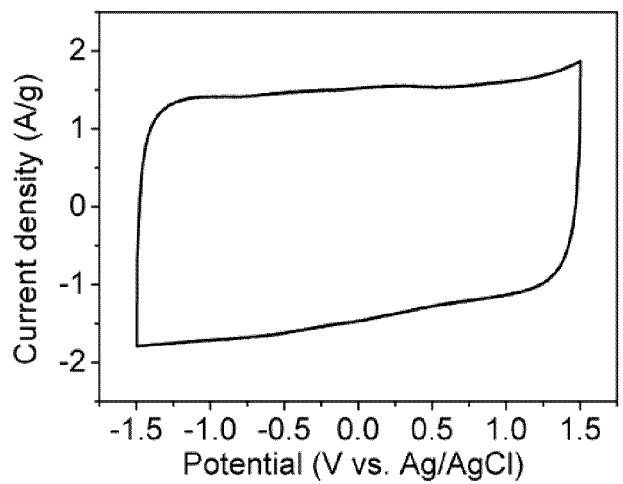
FIG. 12: 3-electrode cyclic voltammetry (CV) test of HGFs in organic electrolyte at a scan rate of about 5 mV/s with Ag/AgCl and Pt foil as the reference and counter electrodes, respectively.
Figure 13:
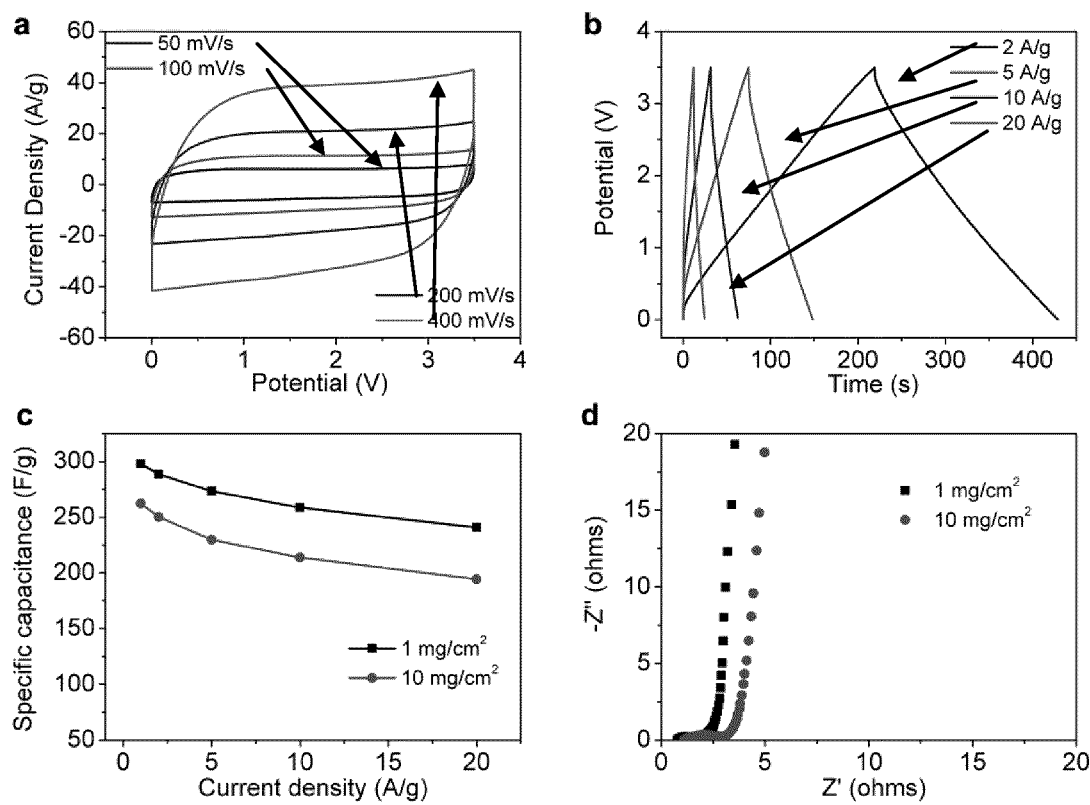
FIG. 13: Electrochemical characterization of HGF-EC with a large areal mass loading of HGF films (about 10 mg graphene/$cm^2$) in organic electrolyte. (a,b) CV curves (a) and galvanostatic charge/discharge curves (b) of HGF-EC. (c) Comparison of specific capacitances of HGF electrodes with different areal mass loadings versus different current densities. (d) Nyquist plots of HGF-ECs with different areal mass loadings of HGF films.

Since energy stored in an EC is proportional to the square of voltage, organic electrolytes are usually more desirable for ECs due to their wider electrochemical window as compared to aqueous electrolytes. To this end, further testing was undertaken on the electrochemical performance of HGF-ECs in 1-ethyl-3-methylimidazolium tetrafluoroborate/acetonitrile (EMIMBF$_4$/AN) electrolyte. The CV testing showed rectangular curves from about 0 to about 3.5 V even at a high scan rate of about 500 mV s$^{-1}$ (FIG. 5a). Meanwhile, galvanostatic charge/discharge curves showed a nearly symmetric triangular shape with small voltage drops at the initial point of the discharge curve (about 0.26 V at the current density of about 50 A g$^{-1}$) (FIG. 5b). Both results indicate an excellent EDL capacitive behavior and a very low ESR (about 2.6Ω) in HGF-EC. Three-electrode CV test at a low scan rate of about 5 mV s$^{-1}$ (FIG. 12) showed there was little pseudocapacitance contribution. The HGF electrodes showed an impressive gravimetric capacitance of about 298 F g$^{-1}$ at a current density of about 1 A g$^{-1}$ (FIG. 5c), about 4% lower than that in aqueous electrolyte (about 310 F g$^{-1}$). Increasing the current density to about 100 A g$^{-1}$, the HGF electrodes retained a high gravimetric capacitance of about 202 F g$^{-1}$. The achievement of such high gravimetric capacitances in organic electrolyte (about 298 F g$^{-1}$) leads to an unprecedented gravimetric energy density of about 127 Wh kg$^{-1}$ (FIG. 17: Table 1), which is comparable to the theoretical value (about 165 Wh kg$^{-1}$) of lead-acid battery electrodes. Based on their packing density of about 0.71 g cm$^{-3}$, the volumetric capacitance and energy density of HGF electrodes were calculated to be about 212 F cm$^{-3}$ and about 90 Wh L$^{-1}$, respectively (Table 1).

To evaluate the practical potential of an EC device, it is desirable to compare the energy density values (stack energy density) normalized by the total weight or volume of the entire EC stack which includes both electrodes, current collectors, electrolyte, separator (and packaging) instead of the active electrode materials alone. To this end, it is desirable to increase the content of electrode materials (e.g., areal mass loading of electrode materials) to maximize the stack energy density. However, this is not always straightforward since a thicker electrode can often increase ESR and decrease ion diffusion rate, leading to a rapid degradation in capacitive performances, which can consequently constrain the achievable stack energy density in a practical device.

To evaluate the performance of the HGF electrodes for practical ECs, testing was undertaken of the electrochemical properties of much thicker HGF electrodes (about 140 μm in thickness) with an areal mass loading of about 10 mg cm$^{-2}$ of graphene (FIG. 7), which is comparable to the carbon amount contained in many commercial ECs. Because of the high electrical conductivity and excellent ion diffusion within the HGF electrodes, the gravimetric capacitance of the HGF electrodes decreased by about 12% from about 298 to about 262 Fg$^{-1}$ at about 1 A g$^{-1}$ as the mass loading is increased from about 1 to about 10 mg cm$^{-2}$ (FIG. 5d), with a slightly increased ESR of about 3.6Ω, which in turn yields a gravimetric energy density of about 112 Wh kg$^{-1}$. Accordingly, the volumetric capacitance and volumetric energy density of HGF electrodes were slightly reduced to about 186 F cm$^{-3}$ (FIG. 5e) and about 79 Wh L$^{-1}$, respectively. Both gravimetric and volumetric values are higher than previous reports for carbon-based materials including activated carbon, carbon nanotubes and graphene with large areal mass loadings (Table 1).

Figure 14:
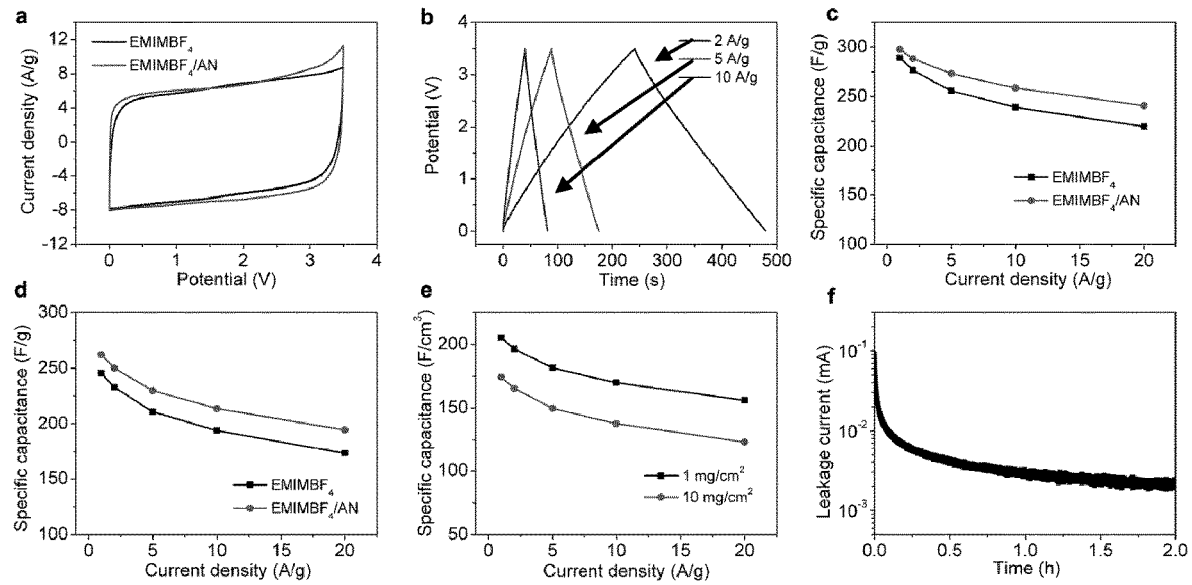
FIG. 14: Electrochemical characterization and comparison of HGF-ECs with neat $EMIMBF_4$ and $EMIMBF_4$/AN as the electrolytes, respectively. (a) CV curves at a scan rate of about 50 mV/s. (b) Galvanostatic charge-discharge curves in neat $EMIMBF_4$. (c) Gravimetric capacitances versus current densities for areal mass loading of about 1 mg/$cm^2$. (d) Gravimetric capacitances versus current densities for areal mass loading of about 10 mg/$cm^2$. (e) Volumetric capacitances versus current densities in neat $EMIMBF_4$ for areal mass loading of about 1 and about 10 mg/$cm^2$, respectively. (f) Leakage current curve for HGF-EC with neat $EMIMBF_4$ and areal mass loading of about 10 mg/$cm^2$. The leakage current of HGF-EC is about 2 μA/F, which is comparable to that of commercial supercapacitors (about 1-3 μA/F).

The HGF-EC with EMIMBF$_4$/AN electrolyte also exhibited excellent cycling stability, with about 91% of its initial capacitance retained after 10000 charge/discharge cycles at a high current density of about 20 A g$^{-1}$ (FIG. 5f). This excellent cycling stability along with the three-electrode test (FIG. 12) indicate that the residual oxygen functionality plays a relatively minor role in the charge/discharge process and would not induce significant side reactions in organic electrolyte. It should be noted that although AN solvent is widely used to promote the ion transport and rate performance, the AN based electrolyte is usually not suitable for the operation of ECs in high-temperature technical areas. Therefore, additional experiments were conducted to evaluate the energy density of the HGF electrode in neat EMIMBF$_4$, which show nearly the same specific capacitance (about 289 F g$^{-1}$ and about 205 F cm$^{-3}$) and energy densities (about 123 Wh kg$^{-1}$ and about 87 Wh L$^{-1}$) (FIG. 14). The ability to achieve similar high capacitance without AN further demonstrates the advantage of HGF for efficient electrolyte transport and efficient surface area access.

Comparison with the State-of-the-Art Electrochemical Energy Storage Devices.

Figure 6:
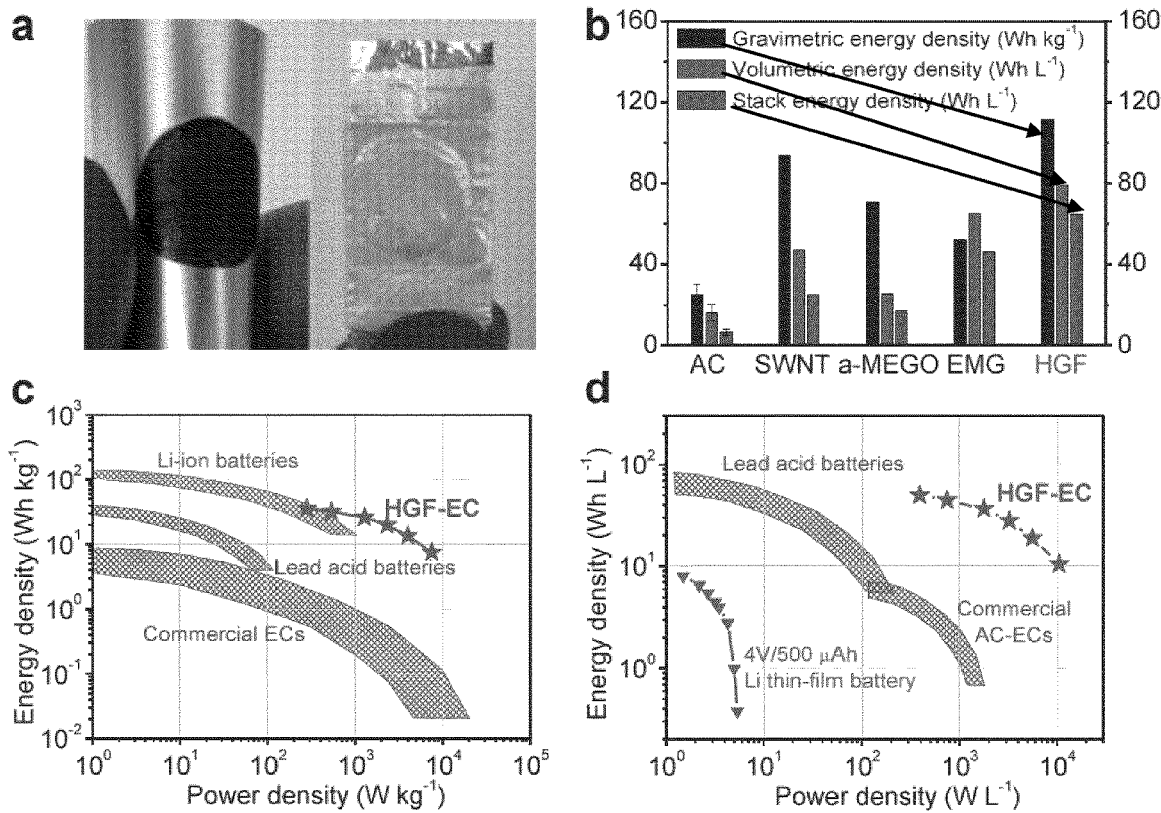
FIG. 6: Comparison of the energy and power densities of HGF-ECs with other state-of-art energy storage technologies. (a) Photographs of one HGF film electrode and one assembled symmetric HGF-EC. (b) Gravimetric and volumetric energy densities (normalized by the total weight or volume of both electrodes in each EC) and volumetric stack energy densities (normalized by the volume of the whole EC including two electrodes, two current collectors, electrolyte and one separator without packaging) for ECs made from various carbon materials. Areal mass loading of electrode materials: activated carbon (AC: about 5 to about 10 mg cm$^{-2}$), single-walled carbon nanotube (SWNT: about 5 mg cm$^{-2}$), activated microwave exfoliated graphene oxide (a-MEGO: about 2.5 mg cm$^2$), electrolyte-mediated graphene (EMG: about 10 mg cm$^{-2}$), HGF (about 10 mg cm$^{-2}$). (c) Ragone plots of gravimetric energy density versus gravimetric power density for HGF-EC in comparison with lead-acid batteries, lithium-ion battery, commercial ECs. (d) Ragone plots of volumetric energy density versus volumetric power density for HGF-EC in comparison with lead-acid batteries, lithium thin-film battery, commercial activated carbon-ECs. The energy and power densities are normalized by the actual weight or volume of the entire device stack including two electrodes, two current collectors, electrolyte, one separator and packaging.

To further evaluate the practical potential of the device, experimental determination was undertaken of the stack energy density values, which were normalized by the total weight or volume of the device including both electrodes, current collectors, electrolyte, separator (and packaging) (FIG. 6a,b). If excluding the packaging, the HGF electrodes account for about 37% weight of the device, and thus the device delivers a high gravimetric and volumetric stack energy densities of about 41.6 Wh kg$^-$ and about 63.2 Wh L$^{-1}$, respectively (FIG. 6b). To include packaging, parafilm is used to seal the devices similarly to other studies (FIG. 6a), and obtained practical stack energy densities of about 35.1 Wh kg$^{-1}$ and about 49.2 Wh L$^{-1}$ for the fully packaged device, which are nearly one order of magnitude higher than those of commercial activated carbon-based ECs (about 4-5 Wh kg$^{-1}$ and about 5-7 Wh L$^{-1}$) and comparable to those of lead-acid batteries (about 25-35 Wh kg$^{-1}$ and about 50-90 Wh L$^{-1}$) (FIG. 6c,d).

The increase in the energy density of ECs usually comes at the cost of power density and cyclability, which are important characteristics of ECs and without which they become mediocre batteries. With fast electron transport and efficient ion transport throughout the entire HGF film electrode, the HGF-EC could also deliver high power densities that are about one order of magnitude higher than those of commercial activated carbon-based ECs, more than two orders of magnitude higher than those of lead acid batteries and three orders of magnitude higher than that of the lithium thin-film batteries (FIG. 6c,d).

Unlike other studies, in which the stack energy densities are often derived by extrapolation of rather small devices, the stack energy density of this example is determined by experiments on practical devices with the size and mass comparable to commercial devices. With a large areal mass loading of HGF electrodes up to about 10 mg cm$^{-2}$ in this example, the device can show a high areal energy density of about 22.4 Wh m$^2$ at an areal power density of about 176 W m$^2$, which exceeds those of commercial devices (about 2-6 Wh m$^{-2}$) and laboratory devices (<about 16 Wh M$^{-2}$) (Table 1). A typical packaged device with about 1-cm$^2$ area can deliver a total energy of about 2.24 mWh and power of about 17.6 mW, also surpassing various studies (Table 1). This is particularly significant for delivering sufficient power in practical applications.

Discussion.

The achievement of comparably high specific capacitances for HGF in aqueous and organic electrolytes indicates that the HGF differs from traditional porous carbon materials such as activated carbon, activated graphene, templated carbon and carbide-derived carbon, which usually exhibit about 20-40% lower specific capacitance in organic electrolyte than in aqueous electrolyte, with a relatively low specific capacitance in organic electrolytes (<about 180 F g$^{-1}$) in spite of their high specific surface area (about 1000-3000 m$^2$ g$^{-1}$). This is largely because these porous carbon materials usually have abundant wormlike tortuous pore channels, a large portion of which cannot be efficiently accessed by the large organic electrolyte ions, and thus are less electrochemically active. In contrast, the HGFs here have several features to ensure a high capacitance both in aqueous and organic electrolytes: (1) The graphene building block has a desirable two-dimensional (2D) flat surface and an ultrahigh theoretical specific surface area of about 2630 m$^2$ g$^{-1}$. The 3D self-assembly of holey graphene sheets produces a porous network structure with the 2D graphene surface readily accessible by electrolyte ions. (2) The HGFs are largely or fully hydrated as prepared and can be readily infiltrated with organic electrolyte through a solvent exchange process to ensure substantially the entire surface area is naturally wetted by electrolyte and accessible by the electrolyte ions. (3) The nanopores in the holey graphene sheet have sizes comparable to or larger than those of organic electrolyte ions and can function as the ion transport shortcuts between neighboring layers of graphene to greatly speed up the ion transport process for improved rate performance.

Figure 15:
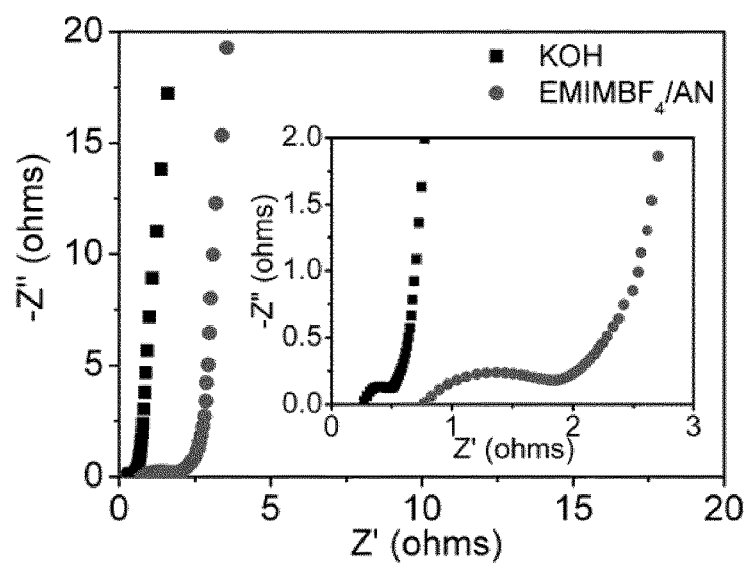
FIG. 15: Nyquist plots of HGF-EC in aqueous and organic electrolytes. The inset shows the close-up view of the high-frequency regime. Due to the lower ionic conductivity of organic electrolyte, a larger semicircle for organic electrolyte indicates a larger charge-transfer resistance in organic electrolyte than in aqueous electrolyte. The equivalent series resistance (ESR) of HGF-EC can be derived to be about 0.6Ω in aqueous electrolyte and about 2.5Ω in organic electrolyte by extrapolating the vertical portion of the plot to the real axis. Although the ESR in organic electrolyte is larger than that in aqueous solution, the difference (about 4 times) is much smaller than that of other studies of chemically reduced graphene (about 10 to 20 times), indicating the organic electrolyte ion diffusion into the pores of HGFs is more efficient than those of other studies.
Figure 16:
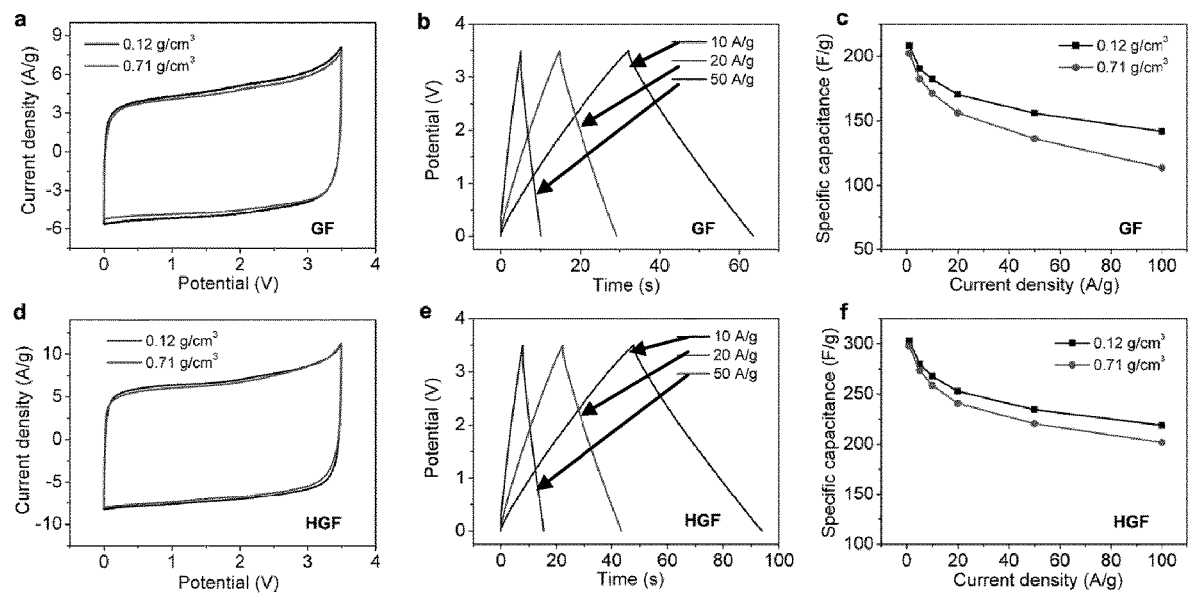
FIG. 16: Comparison of supercapacitive performance of GF and HGF films with different packing densities. A lower packing-density GF and HGF film (about 0.12 g/$cm^3$) was prepared by compression at a smaller pressure of about 0.5 MPa, and used to construct supercapacitor electrodes and compared with high packing-density electrode (about 0.71 g/$cm^3$). (a) CV curves at a scan rate of about 50 mV/s for GF films with packing densities of about 0.12 and about 0.71 g/$cm^3$. (b) Galvanostatic charge-discharge curves for GF films with a packing density of about 0.12 g/$cm^3$. (c) Gravimetric capacitances versus current densities for GF films with an areal mass loading of about 1 mg/$cm^2$. (d) CV curves at a scan rate of about 50 mV/s for HGF films with packing densities of about 0.12 and about 0.71 g/$cm^3$. (e) Galvanostatic charge-discharge curves for HGF films with a packing density of about 0.12 g/$cm^3$. (f) Gravimetric capacitances versus current densities for HGF films with an areal mass loading of about 1 mg/$cm^2$. Compared with GF films, HGF films showed a much smaller decrease in capacitance retention from about 1 to about 100 A/g (about 4% vs. about 13%) when the packing density increased from about 0.12 to about 0.71 g/$cm^3$, indicating the holey graphene sheets could promote efficient ion diffusion in dense film electrodes for rapid charge and discharge process.

Other studies on chemically reduced graphene indicate that ESR values achieved in organic vs. aqueous electrolytes could differ substantially (up to about 10-20 times). In contrast, the EIS studies of this example demonstrate that the ESR values of HGF electrodes show a much smaller difference in organic vs. aqueous electrolyte (FIG. 15), confirming that the HGF electrodes would be well suited for organic electrolytes. Furthermore, investigation was undertaken on the impact of different compression ratio (packing density) on the capacitive performance. The studies demonstrate that a large compression ratio causes a much smaller degradation to the gravimetric capacitance and rate capability of HGF-ECs than it does to the non-holey GFs (FIG. 16), further highlighting that the hierarchical porosity in HGF is particularly important for retaining high specific capacitance and excellent rate performance under highly compressed conditions, which is desirable for simultaneously achieving high gravimetric and volumetric capacitances.

Together, the studies have demonstrated an improved EC electrode design by creating a highly interconnected 3D HGF with superior electrical conductivity, exceptional mechanical flexibility, and hierarchical porosity, which can ensure efficient electron and ion transport to obtain the HGF-ECs with both high gravimetric and volumetric energy densities. Importantly, the overall energy density achievable in these HGF-ECs is comparable to traditional lead acid battery, and with much higher power density. The achievement of such high energy density in HGF-ECs bridges the gap between traditional capacitors and batteries, and can open up exciting opportunities for mobile power supply in a wide range of applications, including electrical vehicles and mobile electronics.

Methods

Preparation of HGFs and GFs.

GO was prepared by oxidation of natural graphite powder according to the modified Hummers' method. HGFs were prepared based on the following procedure. About 1 mL diluted $H_2O_2$ aqueous solution (about 0.3% by weight of $H_2O_2$) was added into about 10 mL of about 2 mg mL$^{-1}$ GO aqueous dispersion in a 25 mL Teflon-lined autoclave. The mixture was sealed and heated at about 180° C. for about 6 hr and naturally cooled down to room temperature, and the as-prepared HGF was taken out with a pair of tweezers and immersed in about 1 M sodium ascorbate aqueous solution at about 100° C. for about 2 hr for further reduction. The HGF was lastly immersed in pure water to remove any impurities for the following experiments. GFs were prepared using the same procedure without adding any $H_2O_2$. The yield of HGFs compared with non-holey GFs is about 74%. In control experiments, about 3% (by weight) and about 30% (by weight) $H_2O_2$ aqueous solution of the same volume (about 1 mL) were used to investigate the effect of $H_2O_2$ concentration on the chemical etching of GO sheets.

Fabrication of HGF- and GF-ECs with Aqueous and Organic Electrolyte.

Slices of HGF with a thickness of about 1 mm were first cut from the as-prepared cylindrical HGFs. For assembly of ECs with aqueous electrolyte: the HGF slices were immersed in about 6.0 M KOH aqueous electrolyte for about 12 hr under stirring to exchange their interior water with electrolyte. For assembly of ECs with organic electrolyte: the HGF slices were first immersed in pure ionic liquid EMIMBF$_4$ under vacuum at about 100° C. for about 12 hr to exchange their interior water with EMIMBF$_4$ and then transferred to a EMIMBF$_4$/AN solution with a weight ratio of about 1:1 for another about 12 hr. Subsequently, the HGF slices solvated with aqueous and organic electrolytes were placed on the platinum or aluminum foils, respectively, and compressed using hydraulic press at a rate of about 0.5 cm min$^{-1}$ during which the squeezed electrolytes were removed by filter papers. The samples were kept under about 150 MPa pressure for about 1 min to form about 14 μm well-adhered films on the metal foils. Next, two same HGF films (both with a net-weight of about 1 mg and an areal mass of about 1 mg cm$^{-2}$) on separate metal foils were directly used as electrodes without any other additives or further treatments such as drying and thermal annealing, and separated by an ion-porous separator (Celgard® 3501) soaked with electrolytes. All the components were assembled into a layered structure and tightly sealed by parafilm for electrochemical measurements. The GF-ECs were fabricated using the similar methods. The assembly of ECs with EMIMBF$_4$/AN electrolyte was done in a glove box filled with Ar. Thicker film electrodes with an areal mass loading of about 10 mg cm$^2$ in ECs were prepared by compressing thicker HGF slices with a thickness of about 1 cm under the same pressure. To determine the packing density, the volume is calculated by measuring the radius (r) and thickness (h) of the compressed HGF film (V=h×π×r$^2$), and directly weighting the net mass of the vacuum dried HGF. The packing density is obtained by dividing the net mass by the volume of the HGF film.

Structural Characterization and Analysis.

The morphologies of HGFs were characterized by Scanning Electron Microscopy (SEM) (JEOL 6700) and Transmission Electron Microscopy (TEM) (FEI CM120). XRD were collected on a Panalytical X'Pert Pro X-ray Powder Diffractometer with Cu-Kα radiation. Methylene blue (MB) dye adsorption method was employed to measure the specific surface areas of HGFs and GFs. MB adsorption is a standard method for measuring the specific surface area of graphitic materials, with about 1 mg of adsorbed MB molecules covering about 2.54 m$^2$ of surface area. The surface areas were calculated by adding a piece of HGF or GF into a standard concentration of MB in deionized (DI) water for a total of about 24 hr to reach adsorption equilibrium. The MB concentration was determined by analyzing the supernatant through UV-vis spectroscopy at a wavelength of about 665 nm and compared to the initial standard concentration of MB prior to interacting with HGF or GF.

Electrochemical Characterization and Analysis.

All the electrochemical experiments were carried out using VersaSTAT 4 from Princeton Applied Research. The electrochemical impedance spectroscopy measurements were performed at open circuit potential with a sinusoidal signal over a frequency range from about 100 kHz to about 10 mHz at an amplitude of about 10 mV. The cycle life tests were conducted by galvanostatic charge/discharge measurements. For the leakage current test, the HGF-ECs were first charged to about 3.5 V at about 10 mA, and then the potential was kept at about 3.5 V for about 2 hr while acquiring the current data.

The gravimetric capacitances ($C_{wt}$) of HGF and GF electrodes derived from galvanostatic discharge curves were calculated based on the following formula: $C_{wt}=2(I\Delta t)/(m\Delta V)$, where I is the constant discharge current, $\Delta t$ is the time for a full discharge, m is the net mass of one electrode, and $\Delta V$ represents voltage drop upon discharging (excluding the $V_{drop}$). The corresponding volumetric capacitances ($C_{vol}$) of HGF and GF electrodes were calculated using: $C_{vol}=C_{wt}\times\rho$, where ρ is the packing density of graphene in HGF or GF films.

The gravimetric ($E_{wt}$) and volumetric ($E_{vol}$) energy density against two electrodes in device were calculated using the following formula: $E_{wt}=C_{wt}V^2/8$ and $E_{vol}=C_{vol}V^2/8$, respectively, where V is the operating voltage (obtained from the discharge curve subtracted by the $V_{drop}$). The areal energy density of the device was calculated by: $E_{area}=E_{wt}\times 2\times m_{area}$, where $M_{area}$ is the areal mass loading of graphene in one electrode. The total energy density of the device was calculated by: $E_{total}=E_{wt}\times M_{total}$, where $M_{total}$ is the total mass of graphene in two electrodes. The gravimetric or volumetric energy density against the entire EC stack ($E_{stack}$) was obtained based on the following formula: $E_{w\text{-}stack}=E_{wt}\times f_{w\text{-}electrode}$ or $E_{v\text{-}stack}=E_{vol}\times f_{v\text{-}electrode}$, where $f_{w\text{-}electrode}$ is calculated by dividing the net mass of two electrodes by the total mass of the device stack or $f_{v\text{-}electrode}$ is calculated by dividing the thickness of two electrodes by the total thickness of the device stack. The entire device stack includes two electrodes, two current collectors, electrolyte, one separator and parafilm packaging. The thickness and areal mass of one membrane separator with electrolyte are about 30 μm and about 3 mg cm$^{-2}$; the thickness and areal mass of one aluminum current collector are about 20 μm and about 5.4 mg cm$^2$; the thickness and areal mass of total wrapped parafilm package are about 100 μm and about 10 mg cm$^{-2}$; the thickness and areal mass of one thick electrode with electrolyte are about 140 μm and about 20 mg cm$^{-2}$. The gravimetric and volumetric stack energy densities were normalized by the total mass and volume of the entire device with just consideration of electrode area. The various power densities of the device (P) were calculated from the following formula: $P=E/\Delta t$, where $\Delta t$ is the discharge time. $R_{ESR}$ is the equivalent series resistance of the device which was calculated via dividing the voltage drop ($V_{drop}$) at the beginning of the discharge by the applied constant current (I) using the formula: $R_{ESR}=V_{drop}/2I$.

Example 2

Functionalized Graphene Hydrogels (FGHs) Based High-Performance Supercapacitors

This example reports the synthesis of FGHs through an one-step chemical reduction of graphene oxide (GO) using hydroquinone as the reducing and functionalizing molecules simultaneously. The mechanically strong FGHs are directly used as supercapacitor electrodes without adding any other binder or conductive additives with an impressive specific capacitance of about 441 F/g at about 1 A/g in an about 1 M H$_2$SO$_4$ aqueous electrolyte, more than double the capacitance of unfunctionalized graphene hydrogels (about 211 F/g). Moreover, the FGHs exhibit excellent rate capability (about 80% capacitance retention at about 20 A/g) and cycling stability (about 86% capacitance retention over 10000 cycles). Based on these results, further fabrication is undertaken of FGHs-based flexible solid-state supercapacitors using $H_2SO_4$-polyvinyl alcohol (PVA) gel as the electrolyte. The integrated devices deliver excellent capacitive performances close to the ones in aqueous electrolyte (about 412 F/g at about 1 A/g, about 74% capacitance retention at about 20 A/g and about 87% capacitance retention over 10000 cycles), and also exhibit extraordinary mechanical flexibility and low self-discharge. The specific capacitances of FGHs-based supercapacitors with aqueous and gel electrolytes are among the highest values achieved in chemically modified graphene electrode materials.

Figure 18:
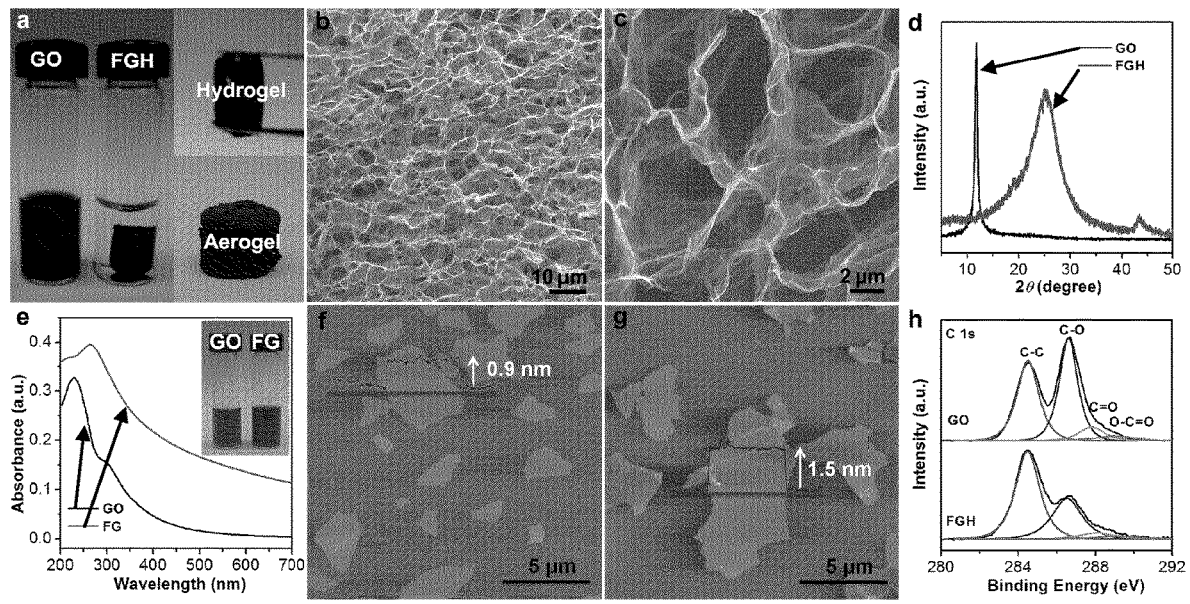
FIG. 18: a) Photographs of an aqueous dispersion of precursors and as-prepared functionalized graphene hydrogel (FGH) and aerogel by freeze-drying. b) Low- and c) high-magnification SEM images of interior microstructures of FGH. d) XRD patterns of GO and freeze-dried FGH. e) UV-vis spectra of aqueous solutions of GO and functionalized (FG). The inset shows the photographs of aqueous dispersions of GO and FG at a low concentration (about 0.1 mg/mL). AFM images of single-layer GO (f) and FG (g) sheets. h) C1s XPS profiles of GO film and freeze-dried FGH.
Figure 22:
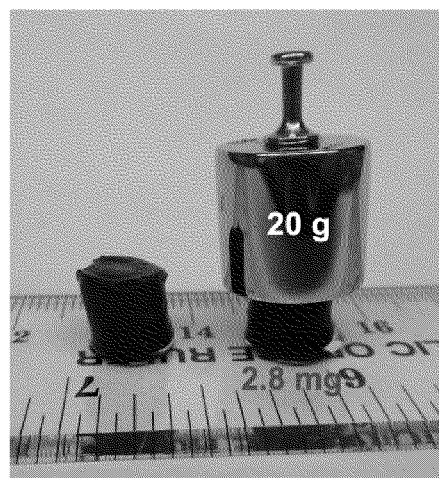
FIG. 22: Photograph of an unloaded FGH (left) and a FGH supporting a weight (about 20 g) of as high as about 7100 times its own dried-weight (about 2.8 mg) (right).
Figure 23:
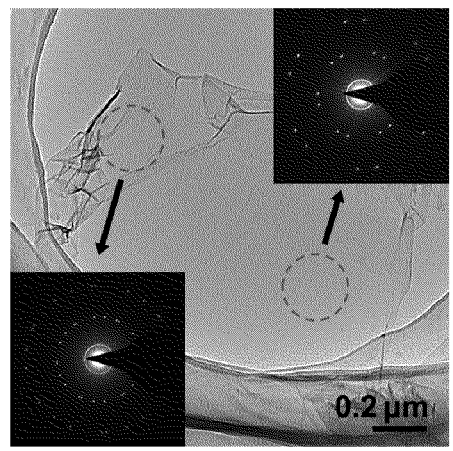
FIG. 23: Typical TEM images of the walls of a FGH framework and the corresponding electron diffraction patterns indicating about 2-4 disoriented crystalline graphene layers.

The FGHs can be readily prepared by heating a homogeneous aqueous mixture of GO (about 2 mg/mL) and hydroquinone (about 10 mg/mL) without stirring at about 100° C. for about 12 hours (FIG. 18a). The obtained FGHs are sufficiently mechanically strong to allow handling with tweezers (FIG. 18a) and supporting a weight of as high as about 7100 times its own dried-weight (FIG. 22). Scanning Electron Microscopy (SEM) images reveal the freeze-dried FGH (aerogel) has an interconnected 3D macroporous network with pore sizes ranging from sub-micrometer to several micrometers and pore walls composed of ultrathin layers of stacked graphene sheets (FIG. 18b,c). X-ray Diffraction (XRD) patterns confirm the efficient de-oxygenation of GO to form graphene framework of FGHs upon hydroquinone reduction (FIG. 18d). The interlayer distance of freeze-dried FGH is calculated to be about 3.56 Å, which is much lower than that of GO precursor (about 7.50 Å) while slightly higher than that of graphite (about 3.35 Å), indicating the existence of π-π stacking between graphene sheets in the FGHs. The broad XRD peak of the freeze-dried FGH indicates the poor ordering of graphene sheets along their stacking direction and reflects that the framework of FGHs is composed of few-layer stacked graphene sheets, which is consistent with the SEM and Transmission Electron Microscopy (TEM) studies (FIG. 23).

Figure 24:
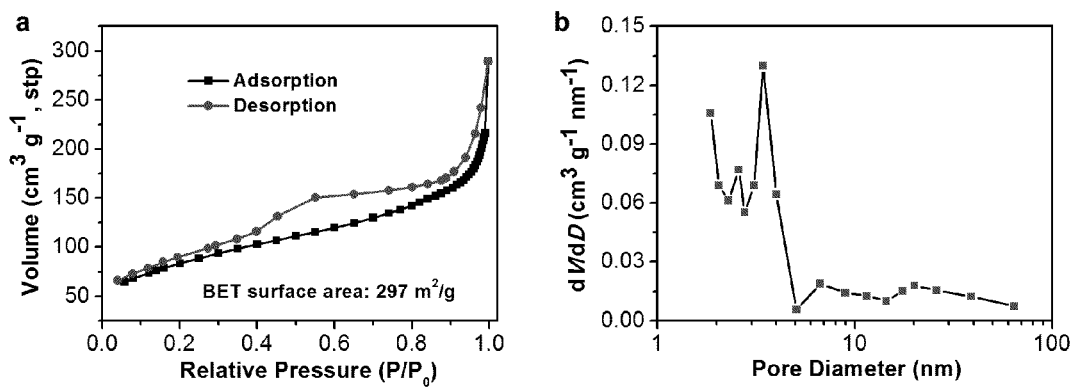
FIG. 24: (a) Nitrogen adsorption and desorption isotherm and (b) BJH pore distribution of the freeze-dried FGHs.

The hierarchical porous structure of FGHs was confirmed by the nitrogen adsorption and desorption measurements. Brunauer-Emmett-Teller (BET) and Barrett-Joyner-Halenda (BJH) analysis reveal that the freeze-dried FGH has a high specific surface area of about 297 $m^2$/g and a pore volume of about 0.95 $cm^3$/g with the pore sizes in the range of about 2-70 nm (FIG. 24). It should be noted that the BET measurement of the freeze-dried FGHs may have substantially underestimated specific surface area of the FGHs because of partial re-stacking of some graphene layers and the fusing of mesopores within FGHs during the freeze-drying process. Considering the FGHs were used directly as the supercapacitor electrodes without freeze-drying, an alternative approach is adopted to determine the intrinsic surface area of FGHs by employing the methylene blue (MB) dye adsorption method. The FGHs showed a high specific surface area of about 1380 $m^2$/g, which is about half of theoretical surface area of single-layer graphene (about 2630 $m^2$/g).

The formation of FGHs was found to be concentration dependent. When a low-concentration aqueous mixture of GO (about 0.1 mg/mL) and hydroquinone (about 0.5 mg/mL) is used with the same feeding ratio for reaction, a black dispersion of functionalized graphene (FG) is obtained that could be centrifuged and redispersed in water (inset of FIG. 18e). This dispersion allowed confirmation of the surface functionalization of graphene by hydroquinone molecules using UV-vis and atomic force microscopy (AFM) characterizations. As shown in FIG. 18e, the main absorption peak at about 230 nm for GO red-shifts to about 266 nm for FG, indicating the recovery of electronic conjugation within FG sheets upon hydroquinone reduction. Another shoulder peak at about 220 nm for FG is ascribed to the absorption of hydroquinone, indicating the existence of hydroquinone molecules adsorbed on the surface of reduced GO. AFM images show a clear height change between single-layer GO (about 0.9 nm) and FG (about 1.5 nm) sheets (FIG. 18f,g). Considering the height of reduced GO is a little lower than that of GO due to de-oxygenation and the distance of π-π interaction between aromatic molecules is about 0.35 nm, it is believed both sides of FG sheets are covered by hydroquinone molecules via π-π interaction.

Figure 25:
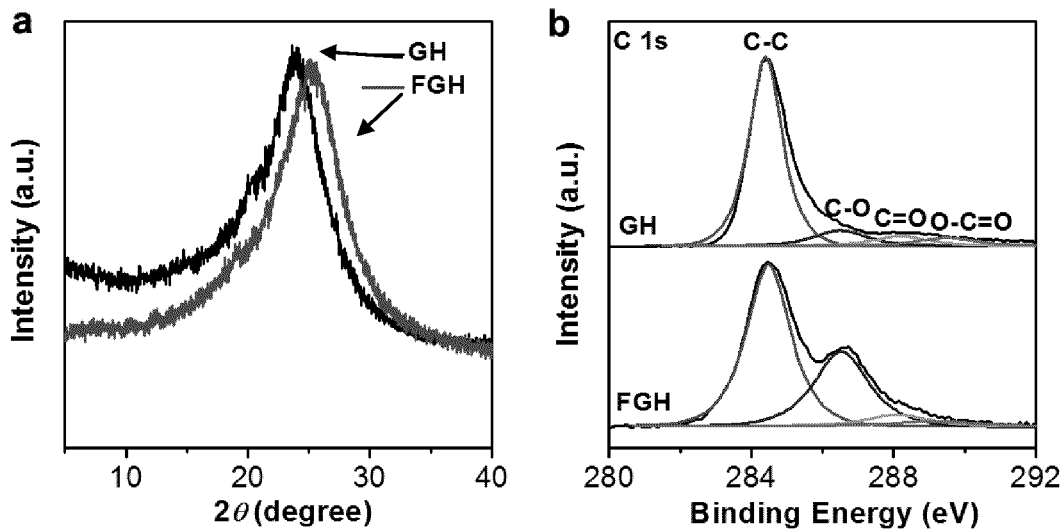
FIG. 25: (a) XRD patterns and (b) C1s XPS profiles of freeze-dried GHs and FGHs. The FGH has a slightly smaller interlayer distance (about 3.56 Å) than GH (about 3.71 Å) based on XRD results (a), indicating the de-oxygenation and recovery of electronic conjugation within the graphene sheets are more efficient in FGHs than in GHs. On the other hand, the XPS results (b) indicate much higher oxygen content in FGHs, which can be largely attributed to the adsorbed hydroquinone molecules.

The surface chemistry of freeze-dried FGHs was further characterized by X-ray Photoelectron Spectroscopy (XPS). Compared with GO, the FGHs have decreased but still with noticeable oxygen functional groups, most of which can be attributed to the adsorbed hydroquinone molecules with two hydroxyl groups (FIG. 25). This is consistent with UV-vis and AFM results. Unfunctionalized graphene hydrogels (GHs) are also prepared by a hydrothermal reduction method. The specific surface area of GHs was measured to be about 1260 $m^2$/g using the MB adsorption technique, which is largely similar to that of FGHs. Compared with GHs, the mass loading of hydroquinone on FGHs was estimated at about 17 wt. % (See experimental methods).

Figure 19:
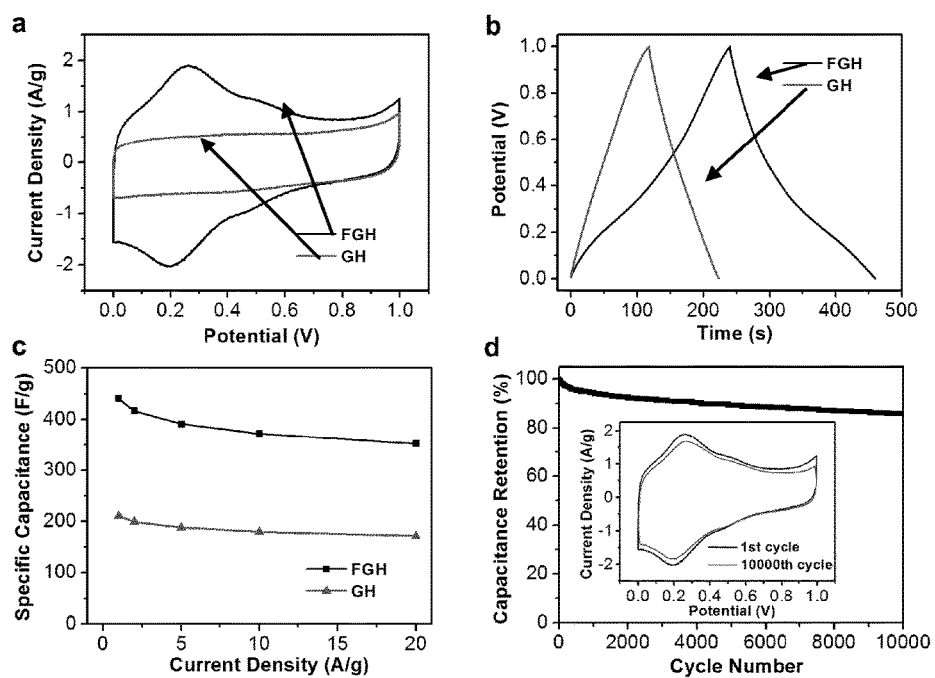
FIG. 19: a) CV curves of FGHs- and unfunctionalized graphene hydrogels (GHs)-based symmetric supercapacitors at a scan rate of about 5 mV/s. b) Galvanostatic charge/discharge curves of the two devices at a current density of about 1 A/g. c) Comparison of specific capacitances versus different current densities. d) Cycling stability of the FGHs-based supercapacitor at a current density of about 10 A/g. The inset shows the CV curves of the device at about 5 mV/s after the 1st and 10000th galvanostatic charge/discharge cycle.
Figure 26:
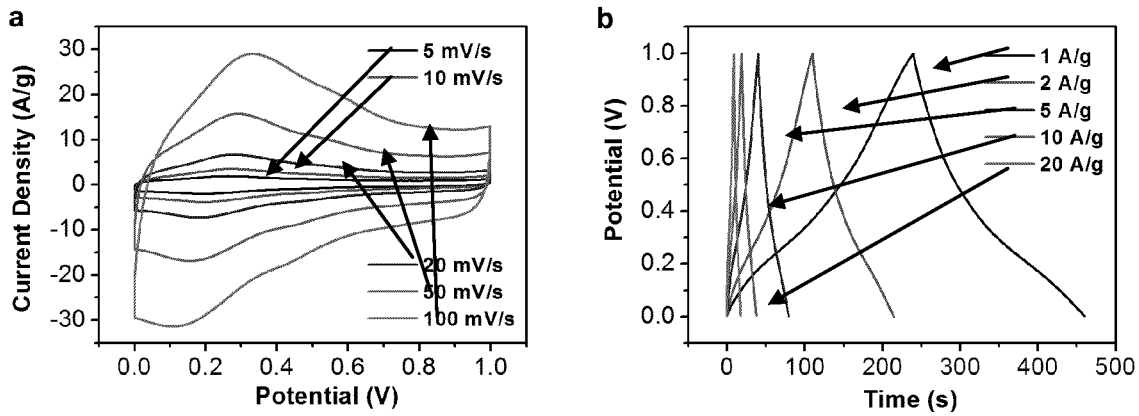
FIG. 26: (a) CV curves of FGH-based supercapacitors at various scan rates. (b) Galvanostatic charge/discharge curves of FGH-based supercapacitors at various current densities.

The FGHs were cut into self-supported slices with a thickness of about 3 mm and a dried-weight of about 2 mg, which were further pressed on two platinum foils and used directly as supercapacitor electrodes for assembling symmetric supercapacitors with about 1 M $H_2SO_4$ aqueous electrolyte. For comparison, unfunctionalized GHs were also tested under the same conditions. FIG. 19a shows cyclic voltammetry (CV) curves of the FGHs- and GHs-based symmetric supercapacitors. It can be seen that the CV curve of GHs exhibit a typical rectangular shape, implying pure electrical double-layer capacitance behavior. In contrast, the CV curve of FGHs displays a box-like shape superimposed with a pair of Faradaic peaks in the potential range of about 0.1-0.3 V, which is caused by the reversible redox reaction of the adsorbed hydroquinone molecules (hydroquinone↔quinone+$2H^+2e^-$) and indicates the coexistence of both electrical double-layer capacitance and pseudocapacitance. Another weak couple of redox peaks at about 0.5 V are associated with the remaining oxygen-containing groups on the graphene sheets of FGHs. The Faradaic peaks of hydroquinone have nearly symmetrical wave-shapes and a small peak separation (about 50 mV), indicating that the surface confined redox reaction have a good reversibility and a fast charge transfer process. Even when the scan rate increases to about 100 mV/s, the CV curve of FGHs basically maintain the Faradaic peaks-incorporated rectangular shape, similar to that observed at about 5 mV/s (FIG. 26a), which is indicative of a quick charge-propagation capability of both the electrical double-layer capacitance and the pseudocapacitance in the FGHs electrodes.

The galvanostatic charge/discharge curves of FGHs show a deviation from the ideal triangle shape exhibited by GHs, especially in the potential range of about 0-0.35 V (FIG. 19b). This result also confirms the significant contribution of pseudocapacitance. The specific capacitance values were derived from the galvanostatic charge/discharge curves of FGHs (FIG. 26b) and are shown in FIG. 19c. The FGHs-based supercapacitor shows an impressive specific capacitance of about 441 F/g at a current density of about 1 A/g, more than double that of GH-based one (about 211 F/g). Assuming that the FGHs hold an electrical double-layer capacitance of about 232 F/g based on the specific surface areas of FGHs and GHs, the pseudocapacitance contributed by hydroquinone is calculated to be about 1461 F/g, about 83% of its theoretical value (about 1751 F/g), indicating a highly efficient utilization of adsorbed hydroquinone in FGHs. Furthermore, upon increasing the current density up to about 20 A/g, the specific capacitance of FGHs remains at about 352 F/g, about 80% of that at about 1 A/g and still more than double that of GHs (about 172 F/g), highlighting the excellent rate capability of FGHs.

A long cycle life is another important concern for practical application of supercapacitors containing pseudocapacitance. Importantly, the FGHs electrodes show excellent electrochemical stability with about 86% of its initial capacitance retained after 10000 charge/discharge cycles at a high current density of about 10 A/g (FIG. 19d). Meanwhile, there is just a small change in the CV curves before and after 10000 charge/discharge cycles (inset of FIG. 19d), indicating the non-covalent interactions between hydroquinone and graphene are strong enough to sustain a long cycle life. Furthermore, the few remaining oxygen functionalities on the graphene sheets of FGHs, which survive the hydroquinone reduction, are also highly stable for achieving excellent cyclability.

It is noted that the specific capacitances achieved in FGHs are significantly higher than those obtained from other chemically modified graphene (Table 2: FIG. 28), such as heteroatoms doped graphene, porous graphene, and oxygen-containing surface-group-functionalized graphene. Moreover, the FGHs electrodes exhibit higher specific capacitances and better cycling stability than graphene/polymer and graphene/$MnO_2$ composites electrodes (Table 3: FIG. 29). There are several factors that can contribute to the outstanding performance of FGHs electrodes. Firstly, the graphene sheets of FGHs provide a large surface area for accommodating a large amount of hydroquinone molecules, which can increase greatly the contribution of pseudocapacitance. Secondly, substantially all the hydroquinone molecules can be directly attached on graphene sheets via π-π interaction. This intimate contact makes full use of the pseudocapacitive component and affords rapid electron transfer from graphene substrate to hydroquinone for the fast Faradaic reaction. Thirdly, the interconnected meso- and macro-porous structure of FGHs can facilitate ions diffusion into the pores as well as electron transport throughout the entire graphene framework.

Figure 20:
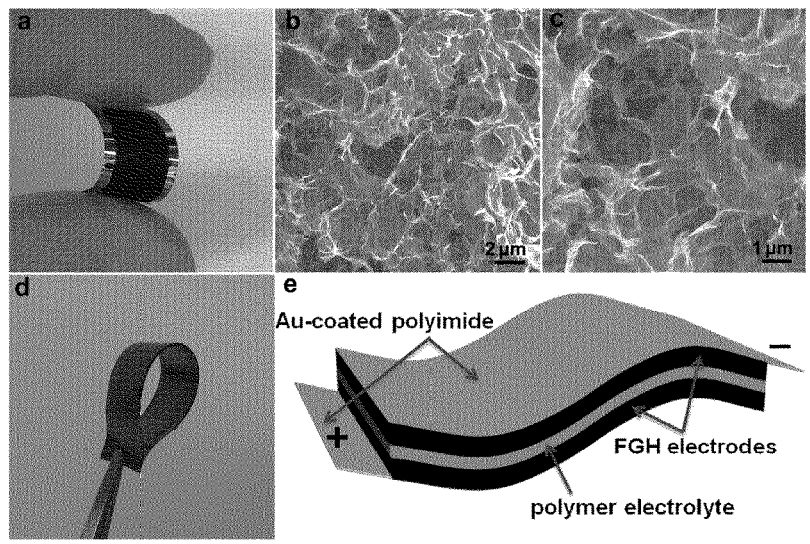
FIG. 20: a) Digital photograph of a flexible FGH thin film electrode. b) Low- and c) high-magnification SEM images of interior microstructures of the FGH film. d) Digital photograph of a FGH-based flexible solid-state supercapacitor. e) A schematic diagram of the solid-state device with $H_2SO_4$-PVA polymer gel as the electrolyte and separator.

In order to demonstrate the superior performances of FGHs electrodes for electrochemical energy storage in flexible electronics, further fabrication was undertaken of flexible solid-state supercapacitors based on FGHs. Due to the exceptional mechanical and electrical robustness of the highly interconnected 3D network of FGHs, assembling FGHs into flexible solid-state device is very convenient. First, a free-standing FGH with a thickness of about 3 mm was cut into rectangular strips with a dried-weight of about 2 mg, which were pressed on the gold-coated polyimide substrates to form flexible thin film electrodes with an areal mass of about 1 mg/$cm^2$ (FIG. 20a). Although the graphene framework became flat and crumpled upon pressing, the 3D continuous porous network was well maintained (FIG. 20b, c), which is beneficial for the gel electrolyte infiltration and ion diffusion. Next, a $H_2SO_4$-PVA aqueous solution (about 10 wt % for both $H_2SO_4$ and PVA) was slowly poured onto two separate FGH films and air-dried for about 12 hours to evaporate excess water. The two FGH electrodes were then pressed together under a pressure of about 1 MPa for about 30 min, which allowed the polymer gel electrolyte on each electrode to combine into one thin separating layer. The resulting solid-state supercapacitor was highly flexible and robust (FIG. 20d,e).

Figure 21:
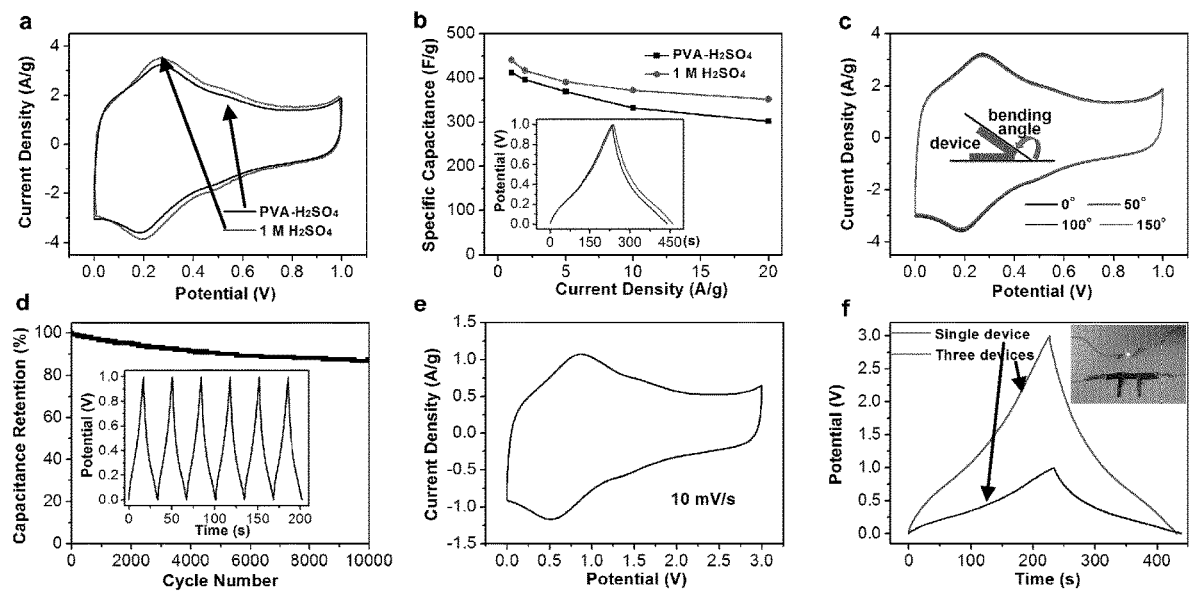
FIG. 21: Comparison of (a) CV curves at about 10 mV/s and (b) specific capacitances of the FGH electrodes in the $H_2SO_4$-PVA gel electrolyte and in the about 1 M $H_2SO_4$ aqueous electrolyte. The inset in (b) shows one cycle of galvanostatic charge/discharge curves at about 1 A/g. c) CV curves at about 10 mV/s of the FGH-based flexible solid-state supercapacitor at different bending angles. d) Cycling stability of the solid-state device at a current density of about 10 A/g under bending state. The inset shows the galvanostatic charge/discharge curves for the device. e) CV curve at about 10 mV/s and (f) one cycle of galvanostatic charge/discharge curves at about 1 A/g of three in-series supercapacitor group. The inset shows a photograph of a green LED turned on by the tandem device.

The FGH-based flexible solid-state supercapacitor shows almost the same CV curve as the one in about 1 M $H_2SO_4$ aqueous electrolyte, where the Faradaic peaks indicates the presence of pseudocapacitance of hydroquinone (FIG. 21a). The specific capacitances were obtained from galvanostatic charge/discharge measurements (inset of FIG. 21b). It is found that the specific capacitance of the solid-state supercapacitor is about 412 F/g at about 1 A/g, about 6.6% lower than that in aqueous electrolyte (about 441 F/g), which is consistent with the CV analysis and reflects the efficient infiltration of polymer gel electrolyte into the 3D network of FGH. As the current density increases from about 1 to about 20 A/g, the solid-state supercapacitor still exhibits a high specific capacitance of about 304 F/g, about 74% of that at about 1 A/g. The difference of rate performance between the solid-state supercapacitor and the one in aqueous electrolyte can be ascribed to higher internal resistance and slower ions diffusion in solid-state devices with gel electrolyte. The specific capacitances of FGH-based solid-state supercapacitor here is substantially higher than other solid-state devices made of carbon nanotubes and their composites, graphene films, and conducting polymers (Table 4: FIG. 30).

The FGH-based solid-state supercapacitor also exhibits extraordinary mechanical flexibility in bending tests. As shown in FIG. 21c, the CV curves of the device measured at various bending angles show almost the same electrochemical behavior even at a large bending angle of about 150°. The performance durability of the device was further characterized by galvanostatic charge/discharge tests up to 10000 cycles at a high current density of about 10 A/g under about 150 bending angle (FIG. 21d). About 13% decay in specific capacitance was observed, highlighting the excellent mechanical and electrical robustness of the interconnected 3D network of FGHs and its favorable interfacial compatibility with the polymer gel electrolyte.

Figure 27:
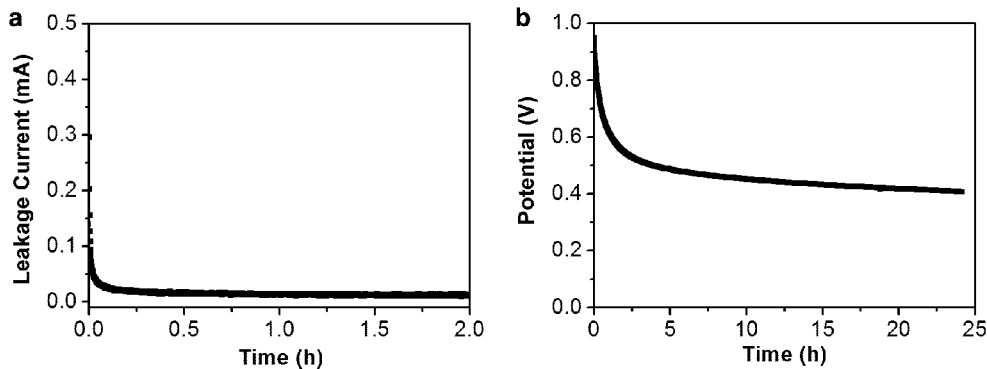
FIG. 27: (a) Leakage current curves of the FGH-based solid-state supercapacitor charged at about 2 mA to about 1.0 V and kept at about 1.0 V for about 2 h. (b) Self-discharge curves of the device after charging at about 1.0 V for about 15 min.

For practical application, the leakage current and self-discharge characteristics of the device are important factors to consider. The leakage current of the FGH-based solid-state supercapacitor was about 12 μA (FIG. 27a) (about 0.015 μA/mF, normalized by capacitance), greatly lower than that of carbon nanotube/polyaniline composite supercapacitor (about 17.2 μA and about 0.034 μA/mF). The self-discharge of the solid-state supercapacitor was also tested (FIG. 27b). The device underwent a rapid self-discharge process in the first half hour; however, the self-discharge course was very slow after several hours. Finally, the device showed a stable output voltage of about 0.5 V after 4 hours and about 41% of the initial charged potential was well retained even after one day, which is significantly higher than polypyrrole-based solid-state supercapacitors (about 0.2 V). The advantage of low self-discharge is highly desirable for applications in flexible electronics.

To further demonstrate the practical usage of the highly flexible solid-state supercapacitor based on FGHs, three supercapacitor units are connected in series to create a tandem device. Each supercapacitor unit has the same mass loading of FGHs (about 2 mg for one electrode). CV and galvanostatic charge/discharge measurements show the potential window is extended from about 1.0 V for one unit to about 3.0 V for a tandem device (FIG. 21e,f). Meanwhile, the tandem device shows almost unchanged charge/discharge time profiles compared with individual units at the same current density (FIG. 21f), indicating the performance of each supercapacitor unit is well retained in the tandem device. After charging at about 3.0 V, the tandem device can light up a green LED (the lowest working potential is about 2.0 V) (inset of FIG. 21f), revealing the potential of the fabricated flexible supercapacitor in energy storage.

In summary, this example demonstrates an one-step strategy to prepare FGHs incorporating hydroquinone onto the high-surface-area 3D graphene framework via π-π interaction as a pseudocapacitive component. This methodology allows efficient loading of pseudocapacitive hydroquinone molecules and fast charge transfer between graphene and hydroquinone, and also ensures rapid ions diffusion and electron transport throughout the entire porous network. The as-prepared FGHs exhibit outstanding electrochemical performances, including ultrahigh specific capacitances and excellent cycling stability in the aqueous electrolyte. The mechanically strong FGHs have been further assembled into flexible solid-state supercapacitors using $H_2SO_4$-PVA gel as the electrolyte. The as-fabricated devices show superior capacitive performances and exceptional mechanical flexibility. These results reveal the electrochemical performances of graphene-based electrodes can be greatly promoted by combination of surface functionalization and hierarchical structures of graphene sheets. This example demonstrates an exciting pathway to the rational design and fabrication of functionalized 3D graphene materials for the electrochemical energy storage and flexible electronics.

Experimental Methods

Graphene oxide (GO) Synthesis and Purification.

GO was prepared by oxidation of natural graphite powder according to the modified Hummers' method. Briefly, graphite (about 3.0 g) was added to concentrated sulfuric acid (about 70 mL) under stirring at room temperature, then sodium nitrate (about 1.5 g) was added, and the mixture was cooled to about 0° C. Under vigorous agitation, potassium permanganate (about 9.0 g) was added slowly to keep the temperature of the suspension lower than about 20° C. Successively, the reaction system was transferred to an about 35-40° C. water bath for about 0.5 h, forming a thick paste. Then, about 140 mL of water was added, and the solution was stirred for another about 15 min. An additional about 500 mL of water was added, followed by a slow addition of about 20 mL of $H_2O_2$ (about 30%), turning the color of the solution from brown to yellow. The mixture was filtered and washed with about 1:10 HCl aqueous solution (about 250 mL) to remove metal ions, followed by repeated washing with water and centrifugation to remove the acid. The resulting solid was dispersed in water by ultrasonication for about 1 h to make a GO aqueous dispersion (about 0.5 wt. %). The obtained brown dispersion was then subjected to about 30 min of centrifugation at about 4000 rpm to remove any aggregates. Finally, it was purified by dialysis for 1 week to remove the remaining salt impurities for the following experiments.

Preparation of Functionalized Graphene Hydrogels (FGHs) and Unfunctionalized Graphene Hydrogels (GHs).

FGHs were prepared according to the following procedure: about 0.2 mL of about 100 mg/mL hydroquinone aqueous solution was mixed with about 2 mL of about 2 mg/mL GO aqueous dispersion and then heated at about 100° C. for about 12 hours without stirring. The as-prepared FGHs were taken out of the vial with a tweezer. GHs were prepared by a hydrothermal reduction method. About 4 mL of about 2 mg/mL GO aqueous dispersion was sealed in a Teflon-lined autoclave and maintained at about 180° C. for about 12 hours. Then the autoclave was naturally cooled to room temperature, and the as-prepared GHs were taken out with a tweezer. The mass loading of hydroquinone in FGHs was calculated using the equation: $W_{HQ}\% = (M_{FGH} - M_{GH})/M_{FGH} \times 100\%$, where $W_{HQ}$ is the mass fraction of hydroquinone in FGHs, and $M_{FGH}$ and $M_{GH}$ are the mass of freeze-dried FGH and freeze-dried GHs, respectively (the FGH and GH were prepared using the same feeding amount of graphene oxide precursor). Considering the FGH has a slightly smaller interlayer distance (about 3.56 Å) than GH (about 3.71 Å) based on XRD results (FIG. 25a), the de-oxygenation within the graphene sheets is likely a little more efficient in FGH than in GH during the reduction process, which could result in a slightly underestimated mass loading of hydroquinone in FGH.

Preparation of Aqueous Dispersion of Functionalized Graphene (FG).

About 0.15 mL of about 100 mg/mL hydroquinone aqueous solution was mixed with about 30 mL of about 0.1 mg/mL GO aqueous dispersion and then heated at about 100° C. for about 12 hours without stirring. The obtained black dispersion containing some aggregates was centrifuged at about 13000 rpm and washed by water two times to remove the free hydroquinone. Finally, the FG solid was redispersed in about 30 mL water by ultrasonication to form a homogeneous dispersion of FG.

Fabrication of FGHs-Based Supercapacitors with Aqueous Electrolyte.

Two slices of FGH (each having a thickness of about 3 mm and a dried weight of about 2 mg) were cut from the as-prepared cylindrical FGHs and immersed in about 1 M $H_2SO_4$ aqueous electrolyte overnight to exchange their interior water with electrolyte. Then, the two FGH slices were pressed on two Pt foils separately and separated by a filtrate paper soaked with electrolyte (about 1 M $H_2SO_4$). All the components were assembled into a layered structure and sandwiched between two PTFE sheets and immersed in about 1 M $H_2SO_4$ for electrochemical measurements. The GHs-based supercapacitors were fabricated using the similar methods.

Fabrication of FGHs-Based Flexible Solid-State Supercapacitors.

First, the $H_2SO_4$-PVA gel electrolyte was prepared as follows: about 1 g of $H_2SO_4$ was added into about 10 mL of deionized water, and then about 1 g of PVA power was added. The whole mixture was heated to about 85° C. under stirring until the solution became clear. Second, an about 3 mm-thick FGH immersed in about 1 M $H_2SO_4$ was cut into rectangular strips with a dried-weight of about 2 mg and pressed on the gold-coated polyimide substrate (surface resistance of about 2Ω) to form a thin film with an areal mass of about 1 mg/cm². In order to assemble into a solid-state device, the prepared $H_2SO_4$-PVA aqueous solution was slowly poured on two FGH films and air-dried at room temperature for about 12 hours to evaporate excess water. Then the two electrodes were pressed together under a pressure of about 1 MPa for about 30 min, which allowed the polymer gel electrolyte on each electrode to combine into one thin separating layer to form an integrated device.

Characterizations.

The morphologies of FGHs were characterized by SEM (JEOL 6700). Methylene blue (MB) dye adsorption method was employed to measure the specific surface areas of FGH and GH. MB adsorption is a standard method for measuring the specific surface area of graphitic materials, with about 1 mg of adsorbed MB molecules covering about 2.54 m² of surface area. The surface areas were calculated by adding a piece of FGH or GH into a standard concentration of MB in DI water for a total of about 24 hr to reach adsorption equilibrium. The MB concentration was determined by analyzing the supernatant through UV-vis spectroscopy at a wavelength of about 665 nm and compared to the initial standard concentration of MB prior to interacting with FGH or GH. All the electrochemical experiments were carried out using VersaSTAT 4 from Princeton Applied Research. The electrochemical impedance spectroscopy measurements were performed over a frequency range from about $10^5$ to about $10^{-2}$ Hz at an amplitude of about 10 mV. The cycle life tests were conducted by galvanostatic charge/discharge measurements with a constant current density of about 10 A/g for 10000 cycles. The specific capacitances derived from galvanostatic discharge curves were calculated based on the following equation: $C=2(I\Delta t)/(m\Delta V)$, where I is the discharge current, $\Delta t$ is the time for a full discharge, m is the mass of one electrode, and $\Delta V$ represents the potential change after a full discharge. For the leakage current test, the device was first charged to about 1.0 V at about 2 mA, and then the potential was kept at about 1.0 V for about 2 h while acquiring the current data. For the self-discharge test, the device was first charged to about 1.0 V at about 2 mA and kept at about 1.0 V for about 15 min, and then the open potential of the device was recorded as a function of time.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "connect," "connected," and "connection" refer to an operational coupling or linking Connected objects can be directly coupled to one another or can be indirectly coupled to one another, such as via another set of objects.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. An electrochemical capacitor comprising:
   a pair of electrodes; and
   an electrolyte disposed between the pair of electrodes,
   wherein at least a first electrode of the pair of electrodes includes a graphene framework film, and the graphene framework film includes interconnected graphene sheets with nanopores formed in and extending through the graphene sheets, and at least one of the nanopores has a size in the range of 1 nm to 100 nm, and with pores between the graphene sheets, and at least one of the pores has a size in the range of 1 µm to 10 µm.

2. The electrochemical capacitor of claim 1, wherein the nanopores are formed in basal planes of the graphene sheets.

3. The electrochemical capacitor of claim 1, wherein at least one of the nanopores has a size in the range of 1 nm to 10 nm.

4. The electrochemical capacitor of claim 1, wherein the graphene framework film has a specific surface area of 1200 $m^2\ g^{-1}$ or more.

5. The electrochemical capacitor of claim 1, wherein the graphene framework film has a packing density of 0.3 g $cm^{-3}$ or more.

6. The electrochemical capacitor of claim 1, wherein the graphene framework film has a packing density of 0.5 g $cm^{-3}$ or more.

7. The electrochemical capacitor of claim 1, wherein the graphene framework film has a packing density of 0.7 g $cm^{-3}$ or more.

8. The electrochemical capacitor of claim 1, wherein the graphene framework film has an electrical conductivity of 500 S $m^{-1}$ or more.

9. The electrochemical capacitor of claim 1, wherein the first electrode has a gravimetric capacitance of 180 F $g^{-1}$ or more, at a current density of 1 A $g^{-1}$.

10. The electrochemical capacitor of claim 1, wherein the first electrode has a volumetric capacitance of 100 F $cm^{-3}$ or more, at a current density of 1 A $g^{-1}$.

11. The electrochemical capacitor of claim 1, wherein the first electrode has a gravimetric capacitance of 180 F $g^{-1}$ or more and a volumetric capacitance of 100 F $cm^{-3}$ or more, at a current density of 1 A $g^{-1}$.

12. The electrochemical capacitor of claim 1, wherein the first electrode has a gravimetric capacitance of 280 F $g^{-1}$ or more and a volumetric capacitance of 210 F $cm^{-3}$ or more, at a current density of 1 A $g^{-1}$.

13. The electrochemical capacitor of claim 1, wherein the first electrode has a gravimetric capacitance of 250 F $g^{-1}$ or more and a volumetric capacitance of 180 F $cm^{-3}$ or more, at a current density of 10 A $g^{-1}$.

14. The electrochemical capacitor of claim 1, wherein the first electrode has a gravimetric energy density of 120 Wh $kg^{-1}$ or more and a volumetric energy density of 90 Wh $L^{-1}$ or more.

15. The electrochemical capacitor of claim 1, wherein the electrochemical capacitor has a gravimetric energy density of 20 Wh kg$^{-1}$ or more and a volumetric energy density of 30 Wh L$^{-1}$ or more, based on a total weight or volume of the entire electrochemical capacitor.

16. The electrochemical capacitor of claim 1, wherein the electrochemical capacitor has a gravimetric energy density of 30 Wh kg$^{-1}$ or more and a volumetric energy density of 40 Wh L$^{-1}$ or more, based on a total weight or volume of the entire electrochemical capacitor.

17. The electrochemical capacitor of claim 1, wherein the first electrode further includes a pseudocapacitive material incorporated in the graphene framework film.

18. The electrochemical capacitor of claim 1, wherein the pseudocapacitive material includes nanoparticles of a metal oxide.

19. The electrochemical capacitor of claim 1, wherein the graphene framework film is a first graphene framework film, and a second electrode of the pair of electrodes includes a second graphene framework film.

20. An electrode structure comprising:
    a current collector; and
    a graphene-based gel connected to the current collector,
    wherein the graphene-based gel includes interconnected graphene sheets with pores between the graphene sheets, at least one of the pores has a size in the range of 1 µm to 10 µm, and the graphene-based gel has a packing density of 0.1 g cm$^{-3}$ or more,
    wherein nanopores are formed in and extend through basal planes of the graphene sheets.

21. The electrode structure of claim 20, wherein the packing density is 0.5 g cm$^{-3}$ or more.

22. The electrode structure of claim 20, wherein at least one of the nanopores has a size in the range of 1 nm to 100 nm.

23. An electrode structure comprising:
    a current collector; and
    a graphene-based gel connected to the current collector,
    wherein the graphene-based gel includes (a) interconnected graphene sheets with pores between the graphene sheets and (b) electrochemically active molecular species adsorbed on the graphene sheets, and at least one of the pores has a size in the range of 1 µm to 10 µm.

24. The electrode structure of claim 23, wherein the electrochemically active molecular species are aromatic.

25. The electrode structure of claim 23, wherein the electrochemically active molecular species have a molecular weight up to 1000 g mol$^{-1}$.

26. The electrode structure of claim 23, wherein the electrochemically active molecular species include functionalizing moieties to allow adsorption on surfaces of the graphene sheets.

27. A method of forming a graphene framework, comprising:
    heating a mixture including an etchant and graphene oxide sheets under reducing conditions to yield reduction of the graphene oxide sheets to graphene sheets, formation of nanopores in and extending through the graphene sheets, and self-assembly of the graphene sheets into a graphene framework.

28. The method of claim 27, wherein the etchant is hydrogen peroxide.

29. The method of claim 27, wherein heating is performed in an autoclave at a temperature from 100° C. to 250° C.

30. A method of forming a graphene framework, comprising:
    forming nanopores in and extending through graphene oxide sheets; and
    heating a dispersion of the graphene oxide sheets under reducing conditions to yield reduction of the graphene oxide sheets to graphene sheets and self-assembly of the graphene sheets into a graphene framework.

* * * * *